(12) United States Patent
Gomi et al.

(10) Patent No.: US 10,116,449 B2
(45) Date of Patent: Oct. 30, 2018

(54) GENERATION DEVICE, TERMINAL DEVICE, GENERATION METHOD, NON-TRANSITORY COMPUTER READABLE STORAGE MEDIUM, AND AUTHENTICATION PROCESSING SYSTEM

(71) Applicant: YAHOO JAPAN CORPORATION, Tokyo (JP)

(72) Inventors: Hidehito Gomi, Tokyo (JP); Hiroshi Ueno, Tokyo (JP); Shuji Yamaguchi, Tokyo (JP); Takashi Kusumi, Tokyo (JP); Masato Kawasaki, Tokyo (JP); Wataru Ogami, Tokyo (JP); Yusuke Kondo, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 164 days.

(21) Appl. No.: 15/226,379

(22) Filed: Aug. 2, 2016

(65) Prior Publication Data

US 2017/0070352 A1    Mar. 9, 2017

(30) Foreign Application Priority Data

Sep. 7, 2015  (JP) ................................ 2015-175486

(51) Int. Cl.
*H04L 29/06* (2006.01)
*H04L 9/32* (2006.01)
(Continued)

(52) U.S. Cl.
CPC ............ *H04L 9/3247* (2013.01); *H04L 9/321* (2013.01); *H04L 9/3231* (2013.01); *H04L 63/06* (2013.01);
(Continued)

(58) Field of Classification Search
None
See application file for complete search history.

(56) References Cited

U.S. PATENT DOCUMENTS

| | | | | |
|---|---|---|---|---|
| 5,923,756 | A | * | 7/1999 | Shambroom ........... G06F 21/41 713/153 |
| 6,032,260 | A | * | 2/2000 | Sasmazel .............. G06F 21/335 726/10 |

(Continued)

FOREIGN PATENT DOCUMENTS

| | | |
|---|---|---|
| JP | 2003-132023 A | 5/2003 |
| JP | 2004-178408 A | 6/2004 |

(Continued)

OTHER PUBLICATIONS

Usman, Muhammad et al. Seamless Vertical Handoff Using Authentication Certificate in GPRS-WLAN Tightly Coupled Integrated Networks. 2008 4th International Conference on Emerging Technologies. https://ieeexplore.ieee.org/stamp/stamp.jsp?tp=&arnumber=4777500 (Year: 2008).*

(Continued)

*Primary Examiner* — Jeremiah L Avery
(74) *Attorney, Agent, or Firm* — Oliff PLC

(57) ABSTRACT

A generation device according to the present application includes a storage unit and a generation unit. The storage unit stores information regarding an authentication module that carries out the authentication based on a result of the verification between registration data registered in advance and predetermined input data. The generation unit controls the generation of authentication result information which is information generated from the verification result acquired from the authentication module while serving as information to be processed through a specific authentication procedure used between the generation unit and an authentication (Continued)

server that carries out the personal authentication of a user using the authentication module.

13 Claims, 12 Drawing Sheets

(51) Int. Cl.
 *H04W 12/06* (2009.01)
 *H04W 12/04* (2009.01)
(52) U.S. Cl.
 CPC ......... *H04L 63/0861* (2013.01); *H04W 12/04* (2013.01); *H04W 12/06* (2013.01)

(56) References Cited

U.S. PATENT DOCUMENTS

| | | | | |
|---|---|---|---|---|
| 7,035,442 | B2* | 4/2006 | Ha | G06F 21/32 340/5.81 |
| 8,627,422 | B2* | 1/2014 | Hawkes | H04L 63/166 380/255 |
| 8,868,914 | B2* | 10/2014 | Teppler | H04L 9/3226 713/155 |
| 9,137,262 | B2* | 9/2015 | Qureshi | H04L 63/20 |
| 9,652,604 | B1* | 5/2017 | Johansson | G06F 21/36 |
| 9,961,060 | B2* | 5/2018 | Nix | H04L 9/0869 |
| 2002/0007457 | A1* | 1/2002 | Neff | H04L 9/006 713/180 |
| 2007/0067634 | A1* | 3/2007 | Siegler | G06F 21/31 713/171 |
| 2007/0220591 | A1* | 9/2007 | Damodaran | H04L 9/0643 726/4 |
| 2007/0245148 | A1* | 10/2007 | Buer | H04L 9/3271 713/182 |
| 2008/0176533 | A1* | 7/2008 | Leleu | G06Q 20/1235 455/411 |
| 2008/0214300 | A1* | 9/2008 | Williams | G06F 21/125 463/29 |
| 2009/0298478 | A1* | 12/2009 | Tyhurst | H04W 4/50 455/414.1 |
| 2010/0269153 | A1* | 10/2010 | Kato | G06F 21/31 726/3 |
| 2011/0047373 | A1 | 2/2011 | Karasawa et al. | |
| 2013/0262857 | A1 | 10/2013 | Neuman et al. | |
| 2013/0311382 | A1 | 11/2013 | Fosmark et al. | |
| 2014/0183269 | A1* | 7/2014 | Glaser | G06F 21/32 235/492 |
| 2014/0289820 | A1* | 9/2014 | Lindemann | G06Q 20/42 726/5 |
| 2014/0289833 | A1* | 9/2014 | Briceno | H04L 63/08 726/7 |
| 2015/0033305 | A1* | 1/2015 | Shear | G06F 21/45 726/6 |
| 2015/0113292 | A1* | 4/2015 | Spalka | G06F 21/6218 713/193 |
| 2015/0222604 | A1* | 8/2015 | Ylonen | H04L 63/062 713/171 |
| 2015/0350168 | A1 | 12/2015 | Hayton | |
| 2016/0087957 | A1* | 3/2016 | Shah | H04L 63/205 726/1 |

FOREIGN PATENT DOCUMENTS

| | | | |
|---|---|---|---|
| JP | 2004-362061 | A | 12/2004 |
| JP | 2005-505194 | A | 2/2005 |
| JP | 2005-258687 | A | 9/2005 |
| JP | 2006-260201 | A | 9/2006 |
| JP | 2011-059749 | A | 3/2011 |
| JP | 2011-227843 | A | 11/2011 |
| JP | 2012-073902 | A | 4/2012 |
| JP | 2012-103784 | A | 5/2012 |
| JP | 2013-204233 | A | 10/2013 |
| JP | 2014-056550 | A | 3/2014 |
| JP | 2014-178845 | A | 9/2014 |
| JP | 2014-191686 | A | 10/2014 |
| JP | 5604016 | B1 | 10/2014 |
| JP | 2014-211678 | A | 11/2014 |
| JP | 2015-138978 | A | 7/2015 |
| JP | 2015232369 | A | 12/2015 |
| WO | 03/30445 | A1 | 4/2003 |

OTHER PUBLICATIONS

Kanade, Sanjay et al. Generating and Sharing Biometrics Based Session Keys for Secure Cryptographic Applications. 2010 Fourth IEEE International Conference on Biometrics: Theory, Applications and Systems. https://ieeexplore.ieee.org/stamp/stamp.jsp?tp=&arnumber=5634545 (Year: 2010).*

Kbar, Ghassan. Wireless Network Token-Based Fast Authentication. 2010 17th International Conference on Telecommunications. https://ieeexplore.ieee.org/stamp/stamp.jsp?tp=&arnumber=5478863 (Year: 2010).*

Feb. 9, 2016 Office Action issued in Japanese Patent Application No. 2015-175486.

Jul. 26, 2016 Office Action issued in Japanese Patent Application No. 2015-179476.

Nov. 15, 2016 Office Action issued in Japanese Patent Application No. 2015-179476.

Aug. 1, 2017 Office Action issued in Japanese Patent Application No. 2017-012396.

May 18, 2018 Office Action Issued in U.S. Appl. No. 15/225,427.

Jul. 14, 2016 Office Action issued in Japanese Patent Application No. 2015-232369.

Nov. 8, 2016 Office Action issued in Japanese Patent Application No. 2015-232369.

May 10, 2018 Office Action Issued in U.S. Appl. No. 15/263,855.

U.S. Appl. No. 15/225,427, filed Aug. 1, 2016 in the name of Kusumi et al.

U.S. Appl. No. 15/263,855, filed Sep. 13, 2016 in the name of Gomi et al.

* cited by examiner

FIG.6

| AUTHENTICA-TION MODULE ID | TYPE | REGISTRATION DATA | AUTHENTICA-TION USER | TRUST-WORTHINESS | ... |
|---|---|---|---|---|---|
| ... | ... | ... | ... | ... | ... |
| 14a | FINGERPRINT | A01 | U1 | 4 | ... |
| | | A02 | U1 | 4 | ... |
| | | ... | ... | ... | ... |
| 14b | IRIS | B01 | U1 | 5 | ... |
| | | – | – | – | ... |
| | | ... | ... | ... | ... |
| 14c | VOICEPRINT | C01 | U1 | 3 | ... |
| | | – | – | – | ... |
| | | ... | ... | ... | ... |
| ... | ... | ... | ... | ... | ... |

Figure 10:
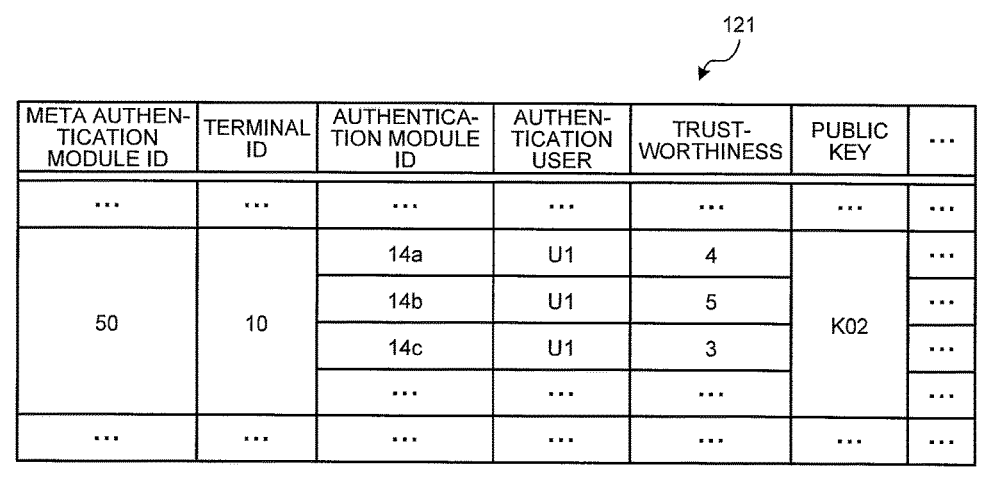

| META AUTHEN-TICATION MODULE ID | TERMINAL ID | AUTHENTICA-TION MODULE ID | AUTHEN-TICATION USER | TRUST-WORTHINESS | PUBLIC KEY | ... |
|---|---|---|---|---|---|---|
| ... | ... | ... | ... | ... | ... | ... |
| 50 | 10 | 14a | U1 | 4 | K02 | ... |
| | | 14b | U1 | 5 | | ... |
| | | 14c | U1 | 3 | | ... |
| | | ... | ... | ... | | ... |
| ... | ... | ... | ... | ... | ... | ... |

121

GENERATION DEVICE, TERMINAL DEVICE, GENERATION METHOD, NON-TRANSITORY COMPUTER READABLE STORAGE MEDIUM, AND AUTHENTICATION PROCESSING SYSTEM

CROSS-REFERENCE TO RELATED APPLICATION(S)

The present application claims priority to and incorporates by reference the entire contents of Japanese Patent Application No. 2015-175486 filed in Japan on Sep. 7, 2015.

BACKGROUND OF THE INVENTION

1. Field of the Invention

The present invention relates to a generation device, a terminal device, a generation method, a non-transitory computer readable storage medium having stored therein a generation program, and an authentication processing system.

2. Description of the Related Art

In recent years, the spread of communication networks have been accelerated and a large number of services through networks have been provided one after another. A user logs in a service provided through a network using a communication terminal device to use the service. When a service through a network is used, it is desired to ensure the personal authentication of a user using the service.

As a technique for the personal authentication, for example, there has been known a technique provided with a terminal that transmits a packet serving as a packet for authenticating a user into which apparatus information has been added and an authentication-side system (server) that receives the packet and uses a user authentication protocol to authenticate the packet, whereby a user operating the terminal is authenticated.

In the prior technique described above, however, it is difficult to flexibly respond to an authentication request. For example, when authentication modes requested by terminals are not limited to passwords and user IDs and include various types of authentication modes such as fingerprint authentication and iris authentication, an authentication server is requested to implement authentication protocols corresponding to respective authentication modes or register authentication modes in advance. For this reason, it is difficult for the authentication server to respond to an unknown authentication mode and flexibly answer a request from a user.

SUMMARY OF THE INVENTION

It is an object of the present invention to at least partially solve the problems in the conventional technology.

A generation device according to the present application includes a storage unit that stores information regarding an authentication module configured to carry out the authentication based on a result of the verification between registration data registered in advance and predetermined input data, and a generation unit that controls the generation of authentication result information which is information generated from the verification result acquired from the authentication module while serving as information to be processed through a specific authentication procedure used between the generation unit and an authentication server configured to carry out the personal authentication of a user using the authentication module.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of an authentication module information storage unit according to the embodiment;

FIG. 10 is a diagram illustrating an example of a meta authentication module information storage unit according to a variation;

DETAILED DESCRIPTION OF THE PREFERRED EMBODIMENTS

Figure 1:
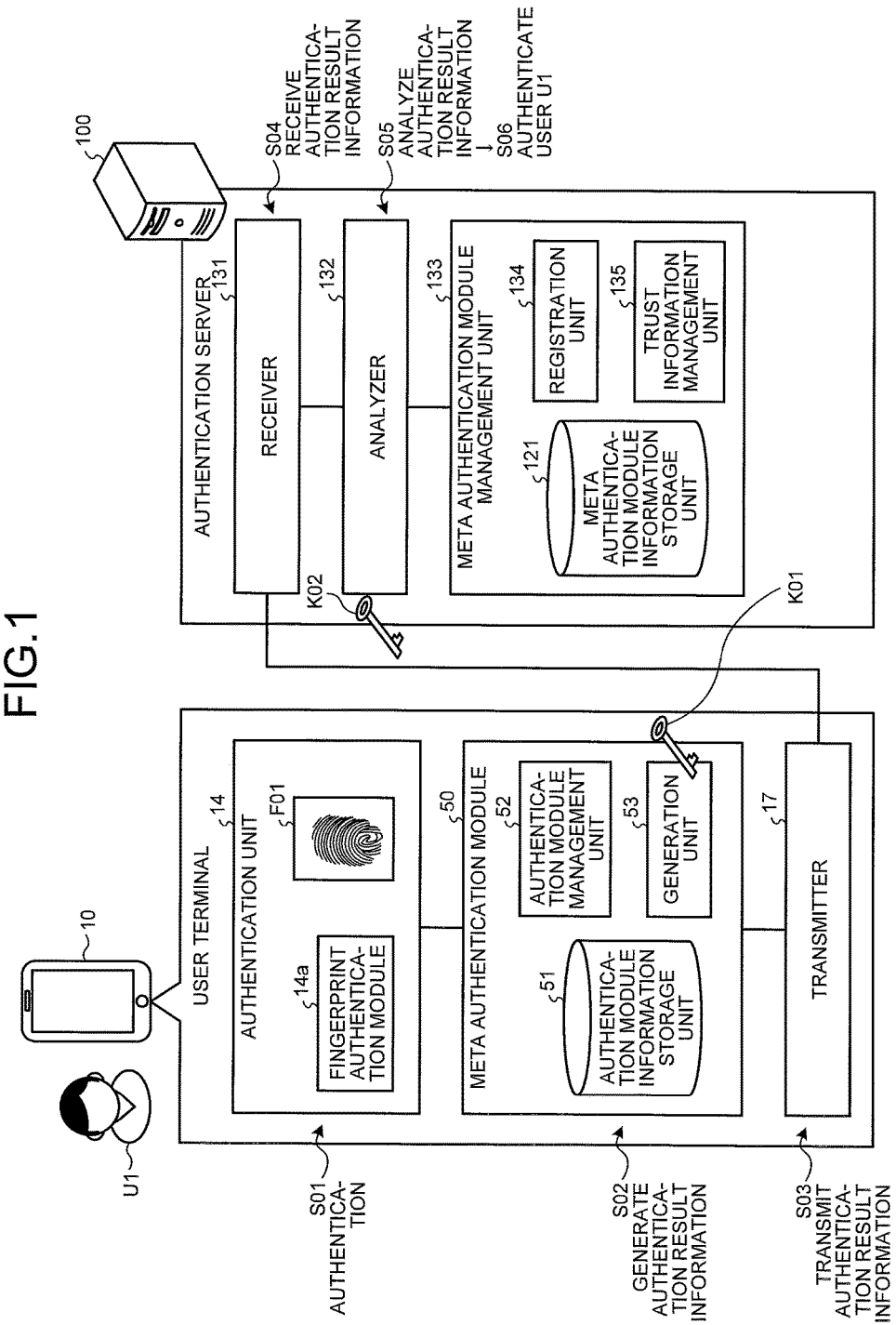
FIG. 1 is a diagram illustrating an example of authentication processing according to an embodiment.

Hereinafter, modes for carrying out a generation device, a terminal device, a generation method, a non-transitory computer readable storage medium having stored a generation program, and an authentication processing system according to the present application (hereinafter, referred to as "embodiments") will be described in detail with reference to the drawings. These embodiments should not be construed to limit the generation device, the terminal device, the generation method, the non-transitory computer readable storage medium having stored the generation program, and the authentication processing system according to the present application. Additionally, the respective embodiments can be combined as appropriate with each other as long as each of the processing content does not conflict to the others. In the respective embodiments below, the same constituent members are denoted with the same reference numerals and the duplicated description will be omitted.

1. Example of Authentication Processing

First, an example of authentication processing according to an embodiment will be described with reference to FIG. 1. FIG. 1 is a diagram illustrating an example of the authentication processing according to the embodiment. FIG. 1 illustrates an example where the authentication processing for a user using a user terminal 10 is carried out by a meta authentication module 50 corresponding to a generation device according to the present application and an authentication server 100.

In the example in FIG. 1, the user terminal 10 is an information processing terminal used by a user U1. The user U1 uses the user terminal 10 to use a service provided through a network, for example, a service provided from a web server. In the following description, the user terminal 10 is noted as the user U1 in some cases. Accordingly, the user U1 can be also read as the user terminal 10 hereinafter.

The authentication server 100 is a server device that acquires information transmitted from the user terminal 10 and carries out the personal authentication of the user U1 based on the acquired information. The information acquired by the authentication server 100 is, for example, information indicating that the user terminal 10 has proved through a biometric authentication module or the like that a user using the user terminal 10 has been the user U1 him/herself. The authentication server 100 authenticates the user U1 as him/herself based on the acquired information and gives information (signature) indicating that the authentication has been done. Once the information to which the signature has been given by the authentication server 100 is transmitted to the respective service suppliers (a web server and the like), it is made possible for the user terminal 10 to use a service requiring the personal authentication, such as login to respective services, utilization of a service ID issued for each service, and account settlement through a network.

(Authentication Scheme of Authentication Server 100)

Here, a scheme used by the authentication server 100 to carry out the personal authentication of a user using a predetermined information processing terminal (hereinafter, noted as "client 20") will be described.

During the authentication of the client 20, the authentication server 100 is assumed to employ an authentication scheme founded on so-called public key cryptography in which the credibility of information is guaranteed through the verification between a public key and a private key that have been issued in advance. The authentication server 100 carries out the authentication based on a pair of the public key and the private key issued to each of authentication modules included in the client 20. The authentication module is a device having a function that enables the client 20 to carry out the personal authentication locally. The authentication carried out locally refers to authentication carried out in a situation requiring no connection to a wide-area network such as the Internet and an example thereof is authentication carried out by using a function provided within the client 20. The authentication module accepts in advance the registration of information with which a user can be authenticated as him/herself, for example, biometric information. Thereafter, the authentication module receives input of the biometric information or the like from the user during the authentication. The authentication module then carries out the personal authentication based on a result of the verification between the registration data and the input data. Specific examples of the authentication module include a fingerprint authentication module, an iris authentication module, and a voiceprint authentication module. The authentication module may be realized by software installed within the client 20, or alternatively, may be realized by hardware capable of being connected locally to the client 20. Accordingly, hardware not using the Internet or another external network is also included in the authentication modules, such as one that works in coordination with the client 20 when directly connected to an interface provided in the client 20.

Figure 2:
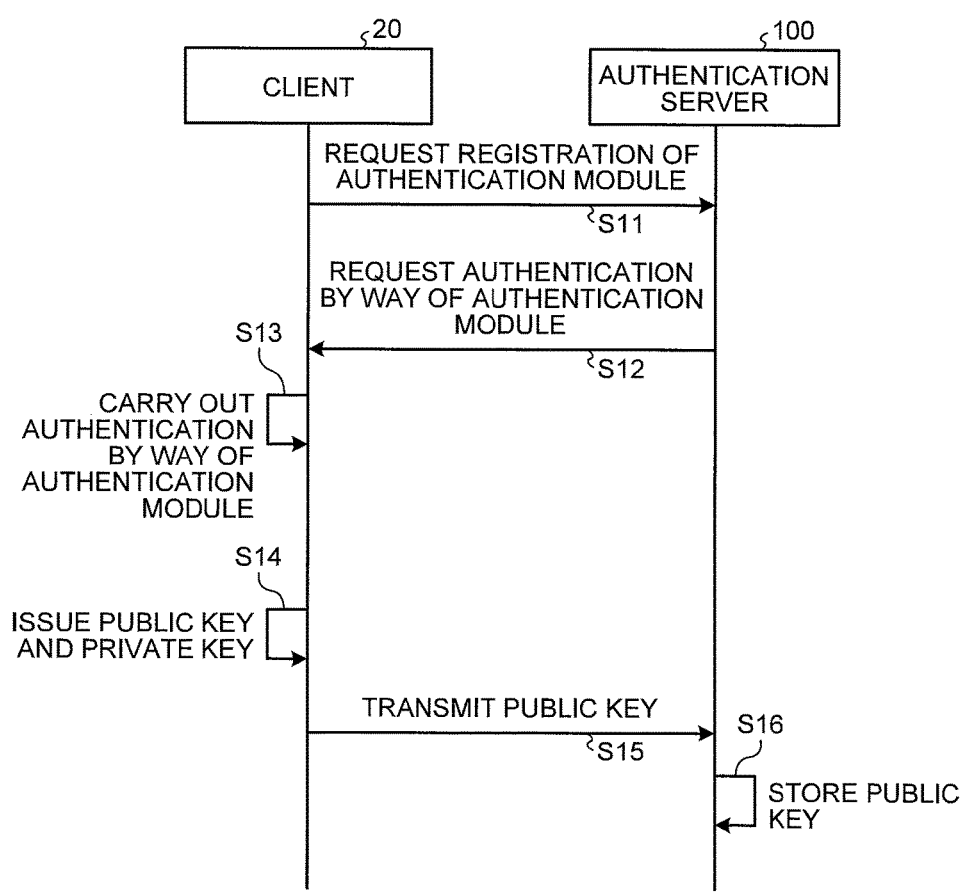
FIG. 2 is a sequence diagram (1) for explaining an authentication scheme according to the embodiment.
Figure 3:
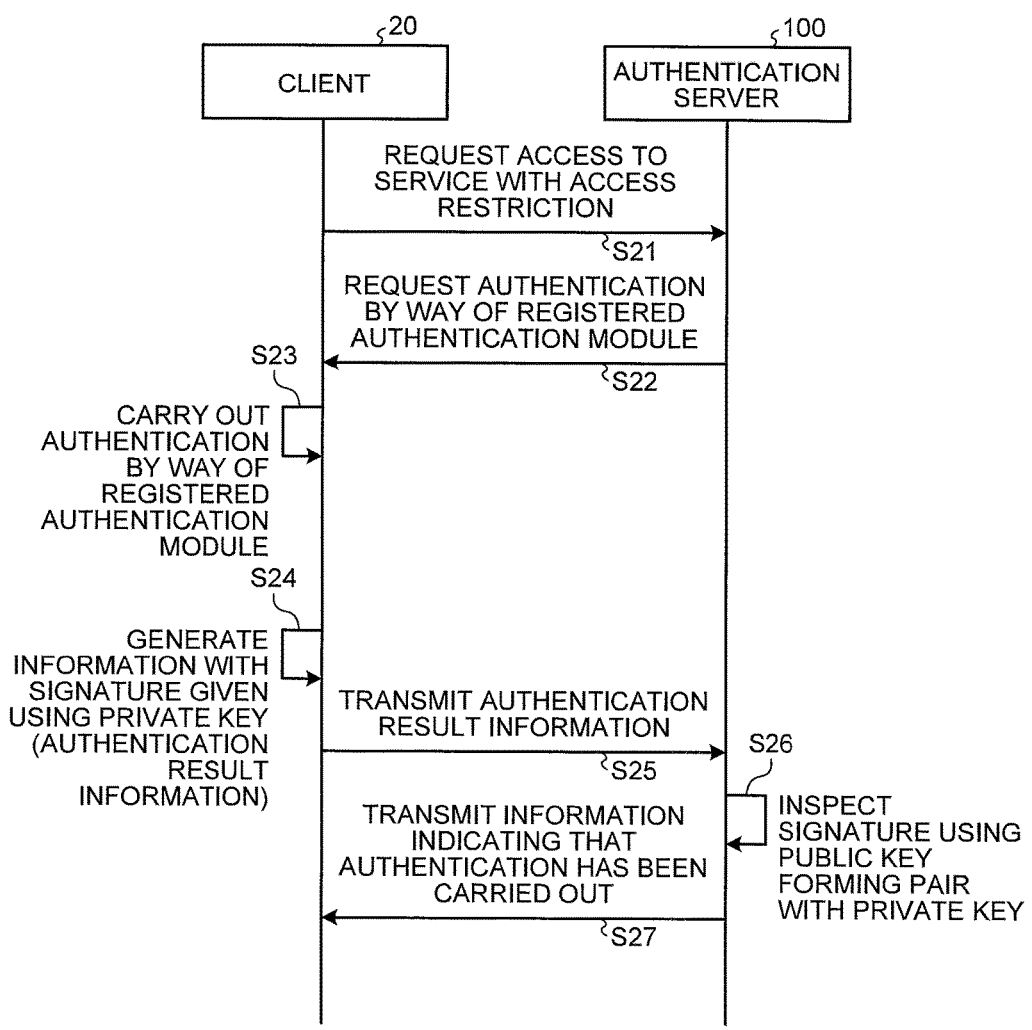
FIG. 3 is a sequence diagram (2) for explaining an authentication scheme according to the embodiment.

Hereinafter, a scheme used by the authentication server 100 to carry out the authentication of the client 20 will be described with reference to FIG. 2 and FIG. 3. FIG. 2 is a sequence diagram (1) for explaining an authentication scheme according to the embodiment. FIG. 2 illustrates a flow of processing for the registration carried out prior to the authentication processing regarding the client 20 to be authenticated by the authentication server 100.

The client 20 accesses the authentication server 100 to request the registration of an authentication module (step S11). The authentication server 100 answers the request transmitted from the client 20 and requests the authentication by way of the authentication module (step S12).

The user using the client 20 starts up the authentication module for which the registration to the authentication server 100 has been requested to locally carry out the personal authentication (step S13). For example, in a case where the user selects the fingerprint authentication module as the authentication module used in the authentication, the user carries out the authentication processing by putting his/her finger over a position where the authentication is carried out. When the authentication module in the client 20 has confirmed the user as a valid user, the authentication module (or client 20) issues the public key and the private key corresponding to that authentication processing (step S14). Thereafter, the client 20 stores the issued private key within the client 20 while transmitting the public key forming a pair with the private key to the authentication server 100 (step S15). The authentication server 100 receives the public key from the client 20 and associates the public key with the authentication module to store (step S16). This completes the registration of the authentication module provided in the client 20 to the authentication server 100.

Subsequently, FIG. 3 will be described. FIG. 3 is a sequence diagram (2) for explaining an authentication scheme according to the embodiment. FIG. 3 illustrates a flow of processing at a scene where the client 20 requests the personal authentication from the authentication server 100 when, for example, a service is used.

The user makes a request to the authentication server 100 for access to a service with predetermined access restriction (step S21). In some cases, such a request is transmitted via, for example, a web server that provides a service through a network. Accordingly, there is a case where the personal authentication is requested to the user in course of using the service from the web server to be connected to. In this case, once the user demonstrates the intention of carrying out the personal authentication, this information is transmitted to the authentication server 100 from the client 20 or the web server to be connected to.

Upon receiving the request, the authentication server 100 makes a request to the client 20 for the authentication by way of the authentication module that has been registered in advance (step S22). Upon receiving the request, the user of the client 20 locally carries out the authentication by way of the authentication module that has been registered in advance (step S23).

When the authentication by way of the authentication module is successful (when the personal authentication is locally confirmed), it is made possible for the user to access the private key stored within the client 20. Thereafter, by using the private key which can be accessed only by a user approved as a valid user by the authentication module, the client 20 generates a signature (hash value) for information regarding a result of the authentication. In other words, the client 20 generates information with the signature given using the private key that has been issued in advance (step S24). The information generated as described above is noted as "authentication result information".

Subsequently, in accordance with a specific authentication procedure (protocol) defined between the client 20 and the authentication server 100, the client 20 transmits the generated authentication result information (step S25) to cause the authentication result information to be processed. The authentication server 100 uses the public key forming a pair with the private key to inspect the transmitted authentication result information (step S26). Specifically, the authentication server 100 inspects that no falsification is found in the authentication result information, in other words, whether the authentication result information has been generated using the proper private key. As described above, the authentication server 100 confirms that the authentication module to be authenticated holds the proper private key. When this confirmation has been successfully done, the authentication server 100 authenticates the user using the client 20 as a valid user based on the authentication result information. Thereafter, the authentication server 100 declares that the authentication has been successfully carried out by the authentication server 100 itself and then transmits, to the client 20, information indicating that the authentication has been carried out, which includes information on the service for which the access is requested at step S21 (step S27). An example of the information indicating that the authentication has been carried out is an authentication cookie.

In this manner, according to the aforementioned authentication scheme, the client 20 does not transmit, to a network, information itself used in the authentication such as the password and the service ID which are often used in typical authentication. Accordingly, even when a third party intercepts the information transmitted from the client 20, the third party does not have the public key and thus cannot use the intercepted information. For this reason, the scheme is considered to have a high degree of safety.

Furthermore, as described above, the authentication server 100 abides by a specific authentication procedure (protocol) defined between the authentication server 100 and the client 20 during the processing of the authentication result information transmitted from the client 20. For example, the authentication server 100 abides by a protocol such as a universal authentication framework (UAF) or a universal second factor (U2F). As a result, a higher degree of safety is ensured in the communication between the authentication server 100 and the client 20.

As described thus far, in a case where the authentication scheme founded on the public key cryptography is employed between the authentication server 100 and the authentication module of the client 20, the client 20 can carry out the personal authentication to the authentication server 100 without transmitting the authentication information itself such as the password to the network. In the aforementioned scheme, however, the user cannot use an authentication module not registered in the authentication server 100 and in addition, the registration is newly required for each of the authentication modules. Consequently, it takes some effort. Moreover, in a case where the client 20 does not support a protocol defined by the authentication server 100, there is such a problem that the user cannot be authenticated by the authentication server 100 and thus cannot use various services requiring the authentication.

For a solution to this, the meta authentication module 50 corresponding to the generation device according to the present application works in coordination with an information processing terminal having difficulties in undergoing the authentication processing by the authentication server 100 independently (corresponding to the user terminal 10 in the example in FIG. 1), thereby making it possible for the information processing terminal to undergo the authentication processing by the authentication server 100. Hereinafter, returning to the description of FIG. 1, an example of the authentication processing including the meta authentication module 50 will be described along a flow thereof. The example illustrated in FIG. 1 assumes that the user terminal 10 includes a fingerprint authentication module 14*a* but the fingerprint authentication module 14*a* is not registered in the authentication server 100 as the authentication module that authenticates the user U1. It is further assumed that, by the user terminal 10 alone, the user terminal 10 cannot generate information corresponding to a specific authentication procedure (protocol) used in the communication with the authentication server 100.

In the example illustrated in FIG. 1, the user U1 is assumed to attempt the authentication to an authentication unit 14 included within the user terminal 10. It is assumed that the authentication unit 14 includes the fingerprint authentication module 14*a* and fingerprint data F01 used in the authentication of the user U1 is registered in the fingerprint authentication module 14*a* in advance. Specifically, the user U1 touches a position in the user terminal 10 for receiving input (e.g., a touch panel display provided in the user terminal 10) with his/her finger corresponding to the fingerprint data F01, thereby inputting fingerprint data to the fingerprint authentication module 14*a*. The fingerprint authentication module 14*a* verifies the input fingerprint data with the registration data, namely, the fingerprint data F01 to authenticate the user U1 (step S01). This means that the fingerprint authentication module 14*a* authenticates the user U1 as him/herself based on the verification result.

Thereafter, the authentication unit 14 sends the authentication result according to the fingerprint authentication module 14*a* to the meta authentication module 50. The meta authentication module 50 includes an authentication module information storage unit 51, an authentication module management unit 52, and a generation unit 53. Here, the meta authentication module 50 is assumed to be treated as the authentication module registered in the authentication server 100. Such registration is carried out in advance by, for example, an administrator of the authentication server 100. In this case, the meta authentication module 50 retains a private key K01 relating to the authentication by the authentication server 100. Meanwhile, the authentication server 100 receives a public key K02 forming a pair with the private key K01 from the meta authentication module 50 to retain.

The authentication module management unit 52 according to the meta authentication module 50 is a processor managing the authentication module included in the authentication unit 14 according to the user terminal 10. For example, the authentication module management unit 52 determines the trustworthiness of respective authentication modules included in the authentication unit 14 and stores the authentication module having a certain degree of trustworthiness regarding the authentication to the authentication module information storage unit 51. When receiving information on a result of the authentication that has been carried out by the authentication module stored in the authentication module information storage unit 51, the authentication module management unit 52 determines this authentication result as being trustworthy. In the example in FIG. 1, the authentication module management unit 52 determines, as trustworthy information, the authentication result according to the fingerprint authentication module 14*a*, which has been received from the authentication unit 14. Thereafter, the authentication module management unit 52 sends a result of the determination to the generation unit 53.

The generation unit 53 according to the meta authentication module 50 is a processor controlling the generation of information corresponding to a specific protocol used in the communication with the authentication server 100. The generation unit 53 receives the authentication result trusted by the authentication module management unit 52. Thereafter, with respect to the received information, the generation unit 53 generates the authentication result information, namely, the information to which the signature has been given using the private key K01 (step S02). The generation unit 53 sends the generated authentication result information to a transmitter 17 according to the user terminal 10.

The transmitter 17 transmits, to the authentication server 100, the authentication result information which is information generated by the meta authentication module 50 while serving as information to be processed by the authentication server 100 through a specific authentication procedure (step S03).

A receiver 131 according to the authentication server 100 receives the authentication result information transmitted from the user terminal 10 (step S04). The receiver 131 sends the received authentication result information to an analyzer 132.

The analyzer 132 analyzes the authentication result information (step S05). At this time, the analyzer 132 identifies the meta authentication module 50 as a transmission source of the information based on the authentication result information. Thereafter, the analyzer 132 makes a query for the trustworthiness of the meta authentication module to a meta authentication module management unit 133 that manages information regarding the meta authentication module. For example, the meta authentication module management unit 133 determines whether the meta authentication module 50 is included in the information that has been stored to a meta authentication module information storage unit 121 by a registration unit 134. The meta authentication module management unit 133 also determines the trustworthiness of each of the meta authentication modules set by a trust information management unit 135. As a consequence thereof, the meta authentication module management unit 133 determines, as a meta authentication module worth being trusted, the meta authentication module 50 that has generated the authentication result information serving as an object to be analyzed. The meta authentication module management unit 133 sends a result of the determination to the analyzer 132.

When the meta authentication module 50 that has generated the authentication result information is determined as a meta authentication module worth being trusted, the analyzer 132 uses the public key K02 that has been issued in advance for a link to the meta authentication module 50 to inspect the signature in the authentication result information. Thereafter, the analyzer 132 confirms that the received authentication result information has been given the signature by the proper private key K01. As a result, the analyzer 132 authenticates the user U1 who is a user corresponding to the authentication result information (step S06).

As described above, the meta authentication module 50 includes the authentication module information storage unit 51 storing the information regarding the authentication module that carries out the authentication based on the result of the verification between the registration data registered in advance and predetermined input. Additionally, the meta authentication module 50 includes the generation unit 53 controlling the generation of the authentication result information which is information generated from the verification result acquired from the authentication module while serving as information to be processed through a specific protocol defined between the generation unit 53 and the authentication server 100 that carries out the personal authentication of the user U1 using the authentication module, thereby carrying out the aforementioned processing.

Consequently, according to the meta authentication module 50, the trustworthiness of the authentication module included within the user terminal 10 is determined by the meta authentication module 50 and thus, the authentication module can be managed by the meta authentication module 50. As a result, even in a case where the plurality of authentication modules is desired to be used in the user terminal 10, the user U1 is not required to carry out the registration to the authentication server 100 each time. Furthermore, as in the example in FIG. 1, even when the user terminal 10 cannot generate the information corresponding to a specific protocol by itself, the user terminal 10 works in coordination with the meta authentication module 50 and accordingly, by using the private key K01, can generate the information used by the authentication server 100 during the authentication. Meanwhile, when viewed from the side of the authentication server 100, after the trustworthiness of the meta authentication module 50 is guaranteed, as for various authentication modules used in the user terminal 10, the authentication server 100 can cause the meta authentication module 50 to determine the trustworthiness of these authentication modules on behalf thereof. As for the authentication, the authentication server 100 can carry out the safe authentication by using the public key and the private key issued for a link to the meta authentication module 50. As described above, the meta authentication module 50 can flexibly responds to the authentication request without deteriorating the safety of the authentication.

2. Configuration of Authentication Processing System

Figure 4:
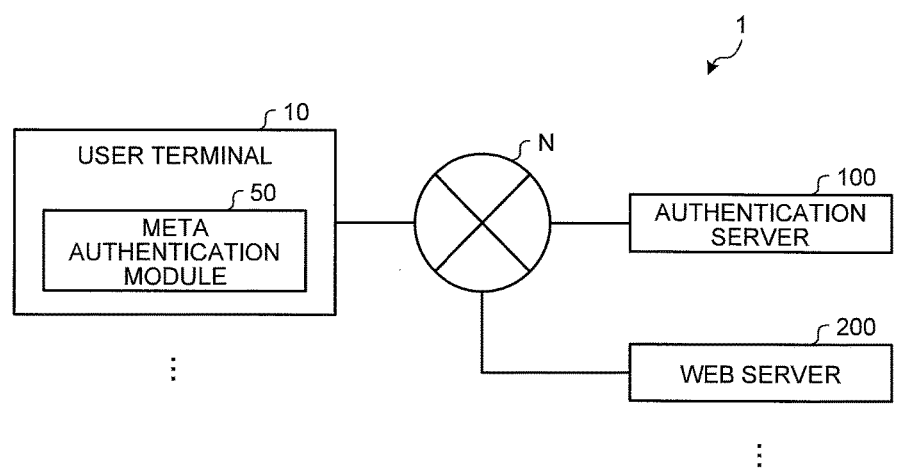
FIG. 4 is a diagram illustrating an exemplary configuration of an authentication processing system according to the embodiment.

Next, a configuration of an authentication processing system 1 including the meta authentication module 50 according to the embodiment will be described with reference to FIG. 4. FIG. 4 is a diagram illustrating an exemplary configuration of the authentication processing system 1 according to the embodiment. As illustrated in FIG. 4 as an example, the authentication processing system 1 according to the embodiment includes the user terminal 10, the meta authentication module 50 included within the user terminal 10, the authentication server 100, and a web server 200. These respective devices are connected through a network N so as to be able to communicate with each other in a wired or wireless manner.

The user terminal 10 is an information processing terminal such as a desktop-type personal computer (PC), a note-type PC, a tablet terminal, a mobile phone including a smartphone, or a personal digital assistant (PDA). Examples of the user terminal 10 also include a glasses type or a watch type information processing terminal, that is, a wearable device. In addition, examples of the user terminal 10 may include various types of smart equipment having an information processing function. For example, smart consumer electrical appliances such as a television (TV), a refrigerator, and a vacuum cleaner, a smart vehicle such as a car, a drone, and a domestic robot may be included in examples of the user terminal 10.

The user terminal 10 is provided with various types of authentication modules. For example, a biometric authentication module that uses biometric information of the user is provided in the user terminal 10. With this, the user terminal 10 locally carries out the personal authentication of the user using the user terminal 10. As described above, the authentication module may be software included within the user terminal 10, or alternatively, hardware connected to the user terminal 10.

The meta authentication module 50 is a generation device that works in coordination with the user terminal 10 and the authentication module provided in the user terminal 10 and, relative to the authentication server 100, controls the generation of the authentication result information obtained from the authentication of the user carried out locally. The meta authentication module 50 is registered to the authentication server 100 in advance and manages the private key forming a pair with the public key held in the authentication server 100. The meta authentication module 50 also manages the authentication module provided in the user terminal 10 and guarantees the trustworthiness of the authentication by the managed authentication module. When the authentication is carried out by the authentication module worth being trusted, the meta authentication module 50 generates the authentication result information to be transmitted to the authentication server 100 based on the verification result from that authentication module.

As described earlier, the authentication server 100 is a server device that carries out the personal authentication of the user using the user terminal 10. The authentication server 100 receives the authentication result information transmitted from the user terminal 10 and inspects the signature in the authentication result information by using the corresponding public key. By using the information to which the signature has been given, the user terminal 10 can carry out the authentication processing for a service provided by the web server 200 or the like.

The web server 200 is a server device that provides various types of web pages when accessed by the user terminal 10. For example, the web server 200 provides various types of web pages regarding a news site, a weather forecast site, a shopping site, a finance (stock price) site, a route search site, a map service site, a travel site, a restaurant review site, a web blog, and the like.

In some cases, the web server 200 requests the personal authentication of the user when providing a service thereto. For example, in a case where the web server 200 cannot authenticate a user using the user terminal 10 surely as the user U1 while providing an account settlement service, the web server 200 can restrict the account settlement service carried out by the user terminal 10. On the other hand, in a case where the information indicating that the authentication server 100 has authenticated the user U1 is received from the user terminal 10 or the authentication server 100, the web server 200 trusts the user using the user terminal 10 as the user U1. In this case, the web server 200 receives an action requiring the personal authentication by the user terminal 10 such as account settlement.

3. Configuration of User Terminal

Figure 5:
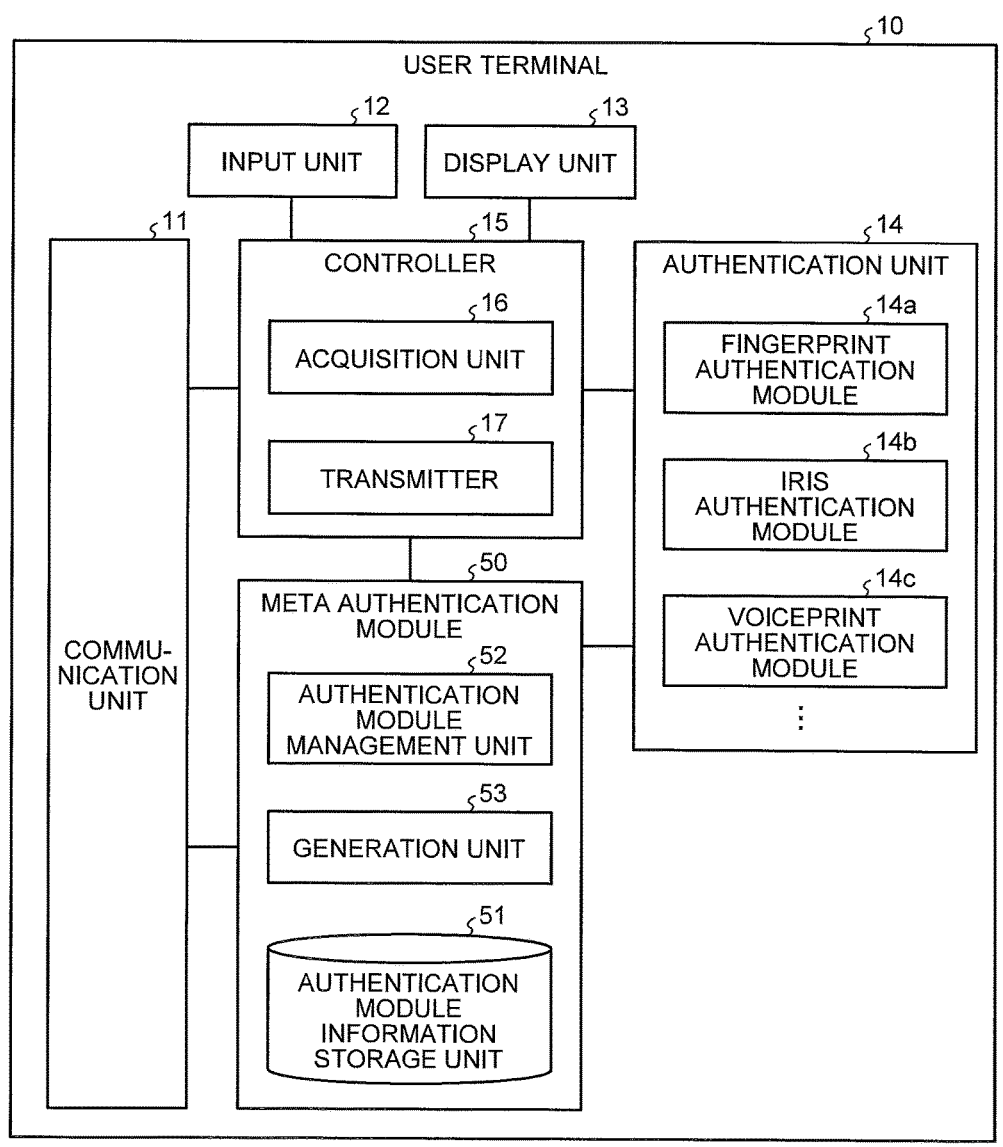
FIG. 5 is a diagram illustrating an exemplary configuration of a user terminal according to the embodiment.

Next, a configuration of the user terminal 10 according to the embodiment will be described with reference to FIG. 5. FIG. 5 is a diagram illustrating an exemplary configuration of the user terminal 10 according to the embodiment. As illustrated in FIG. 5, the user terminal 10 includes a communication unit 11, an input unit 12, a display unit 13, the authentication unit 14, and a controller 15. In the example illustrated in FIG. 5, the user terminal 10 is assumed to have the meta authentication module 50 therein. The connection relationship among the respective processors included in the user terminal 10 is not limited to the connection relationship illustrated in FIG. 5 and another connection relationship may be employed.

The communication unit 11 is connected to the network N in a wired or wireless manner and transmits/receives information to/from the authentication server 100, the web server 200, and the like. For example, the communication unit 11 is realized by a network interface card (NIC).

The input unit 12 is an input device that receives various types of operation from the user. For example, the input unit 12 is realized by an operation key provided in the user terminal 10. In addition, examples of the input unit 12 may include an image pickup device for capturing an image (e.g., a camera) and a sound collection apparatus that collects a sound (e.g., a microphone). The display unit 13 is a display device for displaying various types of information. For example, the display unit 13 is realized by a liquid crystal display. In a case where a touch panel is employed for the user terminal 10, part of the input unit 12 and the display unit 13 are integrated.

The authentication unit 14 authenticates the user using the user terminal 10. Specifically, the authentication unit 14 uses various authentication modules to receive information input from the user. Thereafter, the authentication unit 14 verifies the data registered in the various authentication modules in advance with the input data. The authentication unit 14 then sends the verification result to the controller 15 and the meta authentication module 50.

For example, the authentication unit 14 is provided with the fingerprint authentication module 14a, an iris authentication module 14b, and a voiceprint authentication module 14c as the authentication modules. The fingerprint authentication module 14a accepts the registration of the fingerprint data from the user in advance. Thereafter, the fingerprint authentication module 14a receives input of a fingerprint from the user using the user terminal 10 during the authentication to verify with the registered fingerprint data, thereby carrying out the personal authentication. The iris authentication module 14b accepts the registration of iris data from the user in advance. Thereafter, the iris authentication module 14b receives input of an iris from the user using the user terminal 10 during the authentication to verify with the registered iris data, thereby carrying out the personal authentication. In this case, the iris authentication module 14b uses the function of a camera provided in the user terminal 10 as appropriate. The voiceprint authentication module 14c accepts the registration of voiceprint data from the user in advance. Thereafter, the voiceprint authentication module 14c receives input of a voice from the user using the user terminal 10 during the authentication to verify with the registered voiceprint data, thereby carrying out the personal authentication. In this case, the voiceprint authentication module 14c uses the function of a microphone provided in the user terminal 10 as appropriate.

In addition to the aforementioned examples, authentication modules using various types of information may be provided in the user terminal 10 as the authentication modules. For example, the user terminal 10 may be provided with a face authentication module that uses image data of a face of the user to carry out the authentication. Meanwhile, in a case where the user terminal 10 is a wearable device, the user terminal 10 may use various sensors provided therein as the authentication modules. Specifically, the user terminal 10 retains sensor data acquired from the user in advance and, when used by the user, carries out the verification with the sensor data retained in advance, thereby authenticating the identity of the user. The authentication module is not limited to the authentication module that carries out the authentication using the biometric information. For example, the authentication module may be a hardware authentication module that carries out the authentication when a predetermined physical key owned by the user U1 is connected to the user terminal 10, or alternatively, may be a subscriber identity module card (SIM card) authentication module that carries out the authentication by determining the content of a SIM card built in the user terminal 10. In addition, the user terminal 10 may be provided with such an authentication module that authenticates the user based on identification information assigned to an apparatus connected by the user terminal 10. In this case, for example, the authentication module determines the identification information (e.g., a media access control (MAC) address) assigned uniquely to a router or the like wirelessly connected to the user terminal 10. Thereafter, when the determined identification information has no consistency with the identification information of an apparatus regularly used by the user to be authenticated, the authentication module authenticates the user using the user terminal 10 as him/herself.

For example, the controller 15 is realized by a central processing unit (CPU) or a micro processing unit (MPU) that executes various programs stored in a storage device within the user terminal 10 by using a random access memory (RAM) as a working area. As an alternative example, the controller 15 is realized by an application specific integrated circuit (ASIC), a field programmable gate array (FPGA), or another integrated circuit.

The controller 15 controls processing such as the authentication processing carried out in the user terminal 10, the processing carried out by working in coordination with the meta authentication module 50, and the management of information transmitted to/received from the authentication server 100 or the web server 200. As illustrated in FIG. 5, the controller 15 includes an acquisition unit 16 and the transmitter 17 and realizes or carries out a function or an action for the information processing described below. For example, the controller 15 executes the aforementioned applications by using the RAM as a working area to realize the acquisition unit 16 and the transmitter 17. The internal configuration of the controller 15 is not limited to the configuration illustrated in FIG. 5 and another configuration may be employed as long as the configuration carries out the information processing described later.

The acquisition unit 16 acquires various types of information. For example, the acquisition unit 16 receives information transmitted from the authentication server 100 or the web server 200. The acquisition unit 16 also receives a communication packet transmitted from the authentication server 100 or the web server 200 to require the personal authentication of the user using the user terminal 10. In addition, the acquisition unit 16 acquires various types of information requested from the authentication unit 14. For example, the acquisition unit 16 acquires the fingerprint data of the user using the user terminal 10 through the input unit 12. The acquisition unit 16 also acquires the authentication result information generated by the meta authentication module 50.

The transmitter 17 transmits various types of information. For example, the transmitter 17 transmits, to the authentication server 100, the authentication result information generated by the generation unit 53 according to the meta authentication module 50. The transmitter 17 also transmits, to the web server 200 or the like, the information transmitted from the authentication server 100, to which the signature has been given to indicate that the authentication has been done.

(About Meta Authentication Module 50)

The meta authentication module 50 includes the authentication module information storage unit 51, the authentication module management unit 52, and the generation unit 53 and works in coordination with the user terminal 10 to carry out various types of processing.

The authentication module information storage unit 51 stores information regarding the authentication module included in the user terminal 10. For example, the authentication module information storage unit 51 is realized by a semiconductor memory element such as a RAM or a flash memory, or alternatively, a storage device such as a hard disk or an optical disc. Here, FIG. 6 illustrates an example of the authentication module information storage unit 51 according to the embodiment. FIG. 6 is a diagram illustrating an example of the authentication module information storage unit 51 according to the embodiment. In the example illustrated in FIG. 6, the authentication module information storage unit 51 has items such as "authentication module ID", "type", "registration data", "authentication user", and "trustworthiness".

"Authentication module ID" represents identification information identifying the authentication module. In the embodiment, the authentication module ID is assumed to correspond to the reference numeral of the authentication module. For example, the authentication module ID of the fingerprint authentication module 14a is indicated as "14a".

"Type" represents a type of the authentication module. In the embodiment, the type of the authentication module is indicated by information which can be verified by the authentication module. For example, when the type of the authentication module is "fingerprint", this authentication module uses the fingerprint data to carry out the personal authentication.

"Registration data" represents information identifying data registered to the authentication module in advance for the purpose of the personal authentication. In FIG. 6, "registration data" is conceptually expressed as "A01" and the like, but actually, the fingerprint data of the user, the iris data thereof, the voiceprint data thereof, and the like are stored as the items of the registration data. In addition, as illustrated in FIG. 6, a plurality of items of registration data may be registered to one authentication module. For example, in FIG. 6, two items of data, namely, "A01" and "A02" are registered to the fingerprint authentication module 14a. This indicates that one user U1 registers two types of the fingerprint data, for example, for the thumb and the forefinger.

"Authentication user" represents a user to be authenticated by the authentication module. The plurality of authentication users may be registered to one authentication module. In this case, the authentication module forms a pair with one item of the registration data and one authentication user and therefore has at least the same number of items of the registration data as the number of the authentication users.

"Trustworthiness" represents the trustworthiness of the authentication module managed by the meta authentication module 50. In the example in FIG. 6, the trustworthiness is assumed to be expressed by numerical values of 1 to 5 indicating five levels, where a higher numeral represents a higher degree of trustworthiness. For example, the item of the trustworthiness may be automatically set by the authentication module management unit 52 according to the meta authentication module 50 by referring to a list indicating the trustworthiness of the authentication module, or alternatively, may be set by an administrator of the meta authentication module 50. In addition, the item of the trustworthiness may be set through the specification by the authentication server 100. Meanwhile, the item of the trustworthiness may be set for each item of the registration data instead of each authentication module.

Specifically, FIG. 6 illustrates an example where the authentication module identified by the authentication module ID "14*a*" is of a "fingerprint" authentication type, "A01" and "A02" are registered therefor as the registration data, the authentication user corresponding to the registration data "A01" and "A02" is "U1", and the trustworthiness thereof is "4".

The authentication module management unit 52 manages the authentication module provided in the user terminal 10. For example, the authentication module management unit 52 accepts the registration of the authentication module used for the authentication carried out by the user using the user terminal 10. The authentication module management unit 52 also updates information regarding the registered authentication module. For example, when the user using the user terminal 10 desires to use a new authentication module, the authentication module management unit 52 registers the new authentication module to the authentication module information storage unit 51. The authentication module management unit 52 may be configured to determine the trustworthiness of a new authentication module while registering this authentication module so as to register an authentication module having a certain degree of trustworthiness solely. In this case, for example, the authentication module management unit 52 may be configured to refer to a list or the like indicating the trustworthiness of the authentication module, which has been created in advance by the administrator of the authentication server 100, or the like, in order to determine the trustworthiness of the authentication module.

In addition, the authentication module management unit 52 may update the information regarding the authentication module based on information transmitted from the authentication server 100. For example, based on a value of the trustworthiness specified by the authentication server 100, the authentication module management unit 52 updates a value of the trustworthiness set for the authentication module. The authentication module management unit 52 may be also configured to remove, from the authentication module information storage unit 51, the authentication module that has been determined as not being trustworthy by the authentication server 100. As described above, the authentication module management unit 52 manages the authentication module provided in the user terminal 10 and guarantees the trustworthiness of the authentication module to guarantee the appropriateness of the authentication carried out locally in the user terminal 10.

The generation unit 53 is a processor controlling the generation of the authentication result information. First, the generation unit 53 acquires the verification result according to the authentication module stored in the authentication module information storage unit 51. Thereafter, the generation unit 53 generates the authentication result information which is information generated from the verification result while serving as information to be processed through a specific protocol used between the generation unit 53 and the authentication server 100 that carries out the personal authentication of the user using the authentication module. At this time, the generation unit 53 uses the private key forming a pair with the public key held in the authentication server 100 to give the signature to the verification result acquired from the authentication module, thereby generating the authentication result information. Specifically, the generation unit 53 accesses the private key which is made accessible in a case where the verification result which has been acquired from the authentication module is capable of approving the identity of the user. Thereafter, the generation unit 53 generates the authentication result information to which the signature has been given using the private key which is made accessible based on the verification result from the authentication module. In other words, the generation unit 53 generates information indicating that the personal authentication carried out locally in the user terminal 10 has been successful. The generation unit 53 returns the generated authentication result information to the transmitter 17 according to the user terminal 10 and causes the transmitter 17 to transmit the authentication result information to the authentication server 100. The generation unit 53 may cause a predetermined external device to generate the authentication result information instead of generating the authentication result information within the meta authentication module 50. This point will be described later in detail.

Meanwhile, the generation unit 53 may select the authentication module that authenticates the user of the user terminal 10 based on a predetermined condition. For example, when the user terminal 10 receives the authentication request from the authentication server 100, the generation unit 53 refers to the requested trustworthiness in the authentication. When a service to be used by the user terminal 10 requests a high degree of trustworthiness in the personal authentication, for example, the authentication server 100 can require the authentication carried out in the user terminal 10 to be carried out by an authentication module having a high degree of trustworthiness. Specifically, the web server 200 providing the account settlement service or the like requests the authentication with a high degree of trustworthiness to be carried out for the user using the user terminal 10.

In this case, based on the information regarding the trustworthiness of the authentication module, the generation unit 53 selects the authentication module, based on which the authentication result information is to be generated. For example, the generation unit 53 notifies the user terminal 10 that the authentication of the user is desired to be carried out by the authentication module having the degree of trustworthiness equal to or higher than "4". The user terminal 10 displays this request on the display unit 13, for example, to notify the user of this request. As an example, the user terminal 10 displays a message such as "the authentication with the fingerprint or the iris is required" on a display corresponding to the display unit 13 to notify the user of the selected authentication module. When the specification of the trustworthiness of the respective authentication modules is received from the authentication server 100, as described above, based on the trustworthiness specified by the authentication server 100, the generation unit 53 selects the authentication module, based on which the authentication result information is to be generated. When the authentication module information storage unit 51 stores the plurality of authentication modules, the generation unit 53 may be configured to generate the authentication result information with respect to the respective verification results acquired from the plurality of authentication modules by using a private key common thereto. Accordingly, when the trustworthiness is established between the meta authentication module 50 and the authentication server 100, the meta authentication module 50 can carry out the authentication processing relative to the authentication server 100 using the private key of its own regardless of the type of the authentication module.

4. Configuration of Authentication Server

Figure 7:
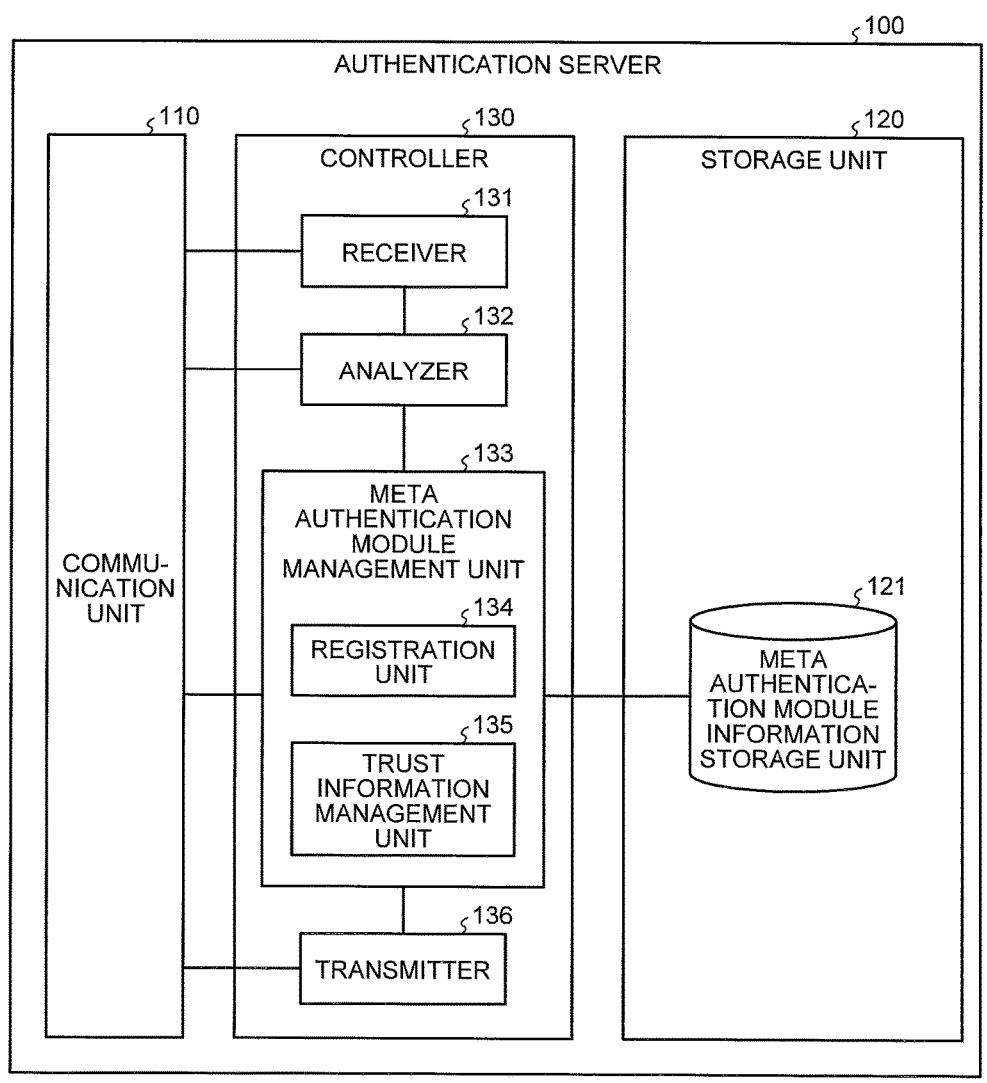
FIG. 7 is a diagram illustrating an exemplary configuration of an authentication server according to the embodiment.

Next, a configuration of the authentication server 100 according to the embodiment will be described with reference to FIG. 7. FIG. 7 is a diagram illustrating an exemplary configuration of the authentication server 100 according to the embodiment. As illustrated in FIG. 7, the authentication server 100 includes a communication unit 110, a storage unit 120, and a controller 130. The authentication server 100 may include an input unit (e.g., a keyboard or a mouse) that receives various types of operation from the administrator or the like using the authentication server 100 and a display unit (e.g., a liquid crystal display) for displaying various types of information.

(About Communication Unit 110)

For example, the communication unit 110 is realized by an NIC. The communication unit 110 is connected to the network N in a wired or wireless manner and transmits/receives information to/from the user terminal 10 and the web server 200 through the network N. When processing the authentication result information transmitted from the user terminal 10, the communication unit 110 abides by a specific protocol having a high degree of safety.

(About Storage Unit 120)

For example, the storage unit 120 is realized by a semiconductor memory element such as a RAM or a flash memory, or alternatively, a storage device such as a hard disk or an optical disc. The storage unit 120 includes the meta authentication module information storage unit 121.

(About Meta Authentication Module Information Storage Unit 121)

Figure 8:
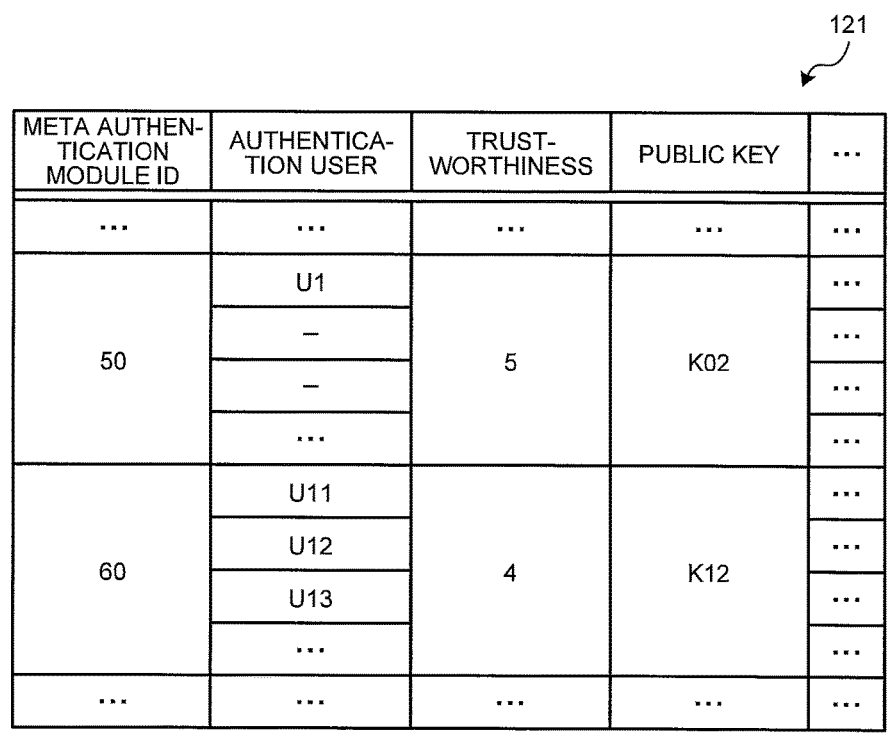
FIG. 8 is a diagram illustrating an example of a meta authentication module information storage unit according to the embodiment.

The meta authentication module information storage unit 121 stores information regarding the meta authentication module. Here, FIG. 8 illustrates an example of the meta authentication module information storage unit 121 according to the embodiment. FIG. 8 is a diagram illustrating an example of the meta authentication module information storage unit 121 according to the embodiment. In the example illustrated in FIG. 8, the meta authentication module information storage unit 121 has items such as "meta authentication module ID", "authentication user", "trustworthiness", and "public key".

"Meta authentication module ID" represents identification information identifying the meta authentication module. In the embodiment, the meta authentication module ID is assumed to correspond to the reference numeral of the meta authentication module. For example, the meta authentication module ID of the meta authentication module 50 is indicated as "50".

"Authentication user" represents a user to be authenticated by the meta authentication module. The plurality of authentication users may be registered to one meta authentication module.

"Trustworthiness" represents the trustworthiness of the meta authentication module relative to the authentication server 100. In the example in FIG. 8, the trustworthiness is assumed to be expressed by numerical values of 1 to 5 indicating five levels, where a higher numeral represents a higher degree of trustworthiness. For example, the item of the trustworthiness is set manually by the administrator of the authentication server 100, or the like by referring to a list indicating the trustworthiness of the meta authentication module.

"Public key" represents a public key corresponding to the authentication result information transmitted from the meta authentication module. The public key is issued at the time when the meta authentication module is registered to the authentication server 100. The private key forming a pair with the public key is retained within each of the meta authentication modules.

Specifically, FIG. 8 illustrates an example where the meta authentication module identified by the meta authentication module ID "50" has an authentication user "U1", the trustworthiness of "5", and a public key "K02".

(About Controller 130)

For example, the controller 130 is realized by a CPU or an MPU that executes various programs (corresponding to examples of the generation program) stored in a storage device within the authentication server 100 by using a RAM as a working area. As an alternative example, the controller 130 is realized by an ASIC, an FPGA, or another integrated circuit.

As illustrated in FIG. 7, the controller 130 includes the receiver 131, the analyzer 132, the meta authentication module management unit 133, and a transmitter 136 and realizes or carries out a function or an action for the information processing described below. The internal configuration of the controller 130 is not limited to the configuration illustrated in FIG. 7 and another configuration may be employed as long as the configuration carries out the information processing described later. The connection relationship among the respective processors included in the controller 130 is not limited to the connection relationship illustrated in FIG. 7 and another connection relationship may be employed.

(About Receiver 131)

The receiver 131 receives various types of information. For example, the receiver 131 receives the authentication result information transmitted from the user terminal 10. In addition, when the user terminal 10 accesses the web server 200 and a service provided by the accessed web server 200 requests the authentication from the user terminal 10, the receiver 131 receives this authentication request from the web server 200. In this case, in response to the authentication request received by the receiver 131, the transmitter 136 described later transmits, to the user terminal 10, a notification indicating that the user terminal 10 is to be subjected to the authentication.

(About Analyzer 132)

The analyzer 132 analyzes the authentication result information. Specifically, the analyzer 132 analyzes the authentication result information transmitted from the user terminal 10 to identify the meta authentication module 50 from which the authentication result information has been generated. At this time, the analyzer 132 inspects the signature in the authentication result information through the meta authentication module management unit 133 by using the public key corresponding to the meta authentication module 50 from which the authentication result information has been generated.

Thereafter, when the meta authentication module 50 from which the authentication result information has been generated is determined as the meta authentication module worth being trusted, the analyzer 132 approves the authentication result information transmitted from the user terminal 10 as valid authentication information. The analyzer 132 then sends, to the transmitter 136, information indicating that the authentication result information has been authenticated and causes the transmitter 136 to transmit the information to the user terminal 10.

The analyzer 132 may be configured not to approve the identity of the user indicated by that authentication result information when a predetermined meta authentication module which has generated that authentication result information is determined as a device having a lower degree of trustworthiness than a predetermined reference. For example, the analyzer 132 may be configured not to approve the identity of the user indicated by the authentication result information when a predetermined meta authentication module which has generated that authentication result information is not stored in the meta authentication module information storage unit 121 managed by the meta authentication module management unit 133, or when the meta authentication module from which that authentication result information has been generated has a particularly low value of the trustworthiness.

(About Meta Authentication Module Management Unit 133)

The meta authentication module management unit 133 manages information regarding the meta authentication module 50. For example, the meta authentication module management unit 133 associates the meta authentication module 50 having the private key with the public key corresponding to that private key to manage. The meta authentication module management unit 133 includes the registration unit 134 and the trust information management unit 135.

(About Registration Unit 134)

The registration unit 134 registers a predetermined meta authentication module. For example, the registration unit 134 receives input from the administrator of the authentication server 100 to register the meta authentication module 50 to the meta authentication module information storage unit 121. The registration unit 134 also registers the user U1 to be authenticated by the meta authentication module 50 and the trustworthiness of the meta authentication module 50 additionally to the meta authentication module information storage unit 121.

Furthermore, among the public key and the private key forming a pair between the authentication server 100 and the meta authentication module 50, the registration unit 134 associates the public key with the meta authentication module 50 to register. When the authentication result information is analyzed by the analyzer 132, the meta authentication module management unit 133 passes the public key registered by the registration unit 134 to the analyzer 132 and causes the analyzer 132 to analyze the authentication result information.

(About Trust Information Management Unit 135)

The trust information management unit 135 manages the trustworthiness of the meta authentication module. For example, the trust information management unit 135 refers to the authentication module to be used by the meta authentication module during the authentication and determines the trustworthiness of the authentication carried out by each of the meta authentication modules to update the value of the trustworthiness of the meta authentication module stored in the meta authentication module information storage unit 121. The trust information management unit 135 may update the trustworthiness of the meta authentication module through input from the administrator of the authentication server 100.

(About Transmitter 136)

The transmitter 136 transmits various types of information. For example, in a case where the authentication of the identity of the user using the user terminal 10 is required to be carried out in order to use a service, the transmitter 136 transmits, to the user terminal 10, information indicating that the authentication is requested. The transmitter 136 also transmits, to the user terminal 10, information indicating that the personal authentication of the user has been done, which information has been inspected using the public key by the analyzer 132 that has analyzed the authentication result information. The transmitter 136 may transmit the information indicating that the authentication has been done to the web server 200 providing the service. Specifically, when the receiver 131 receives the authentication request for the user terminal 10 through the web server 200, the authentication server 100 makes a request to the user terminal 10 for the authentication. Thereafter, the authentication server 100 authenticates the user of the user terminal 10. In this case, in reply to the web server 200 that has transmitted the authentication request for the user terminal 10, the transmitter 136 transmits thereto the information indicating that the authentication has been done. The web server 200 then provides the service to the user of the user terminal 10 based on the information indicating that the authentication has been done, which has been transmitted as a reply.

5. Processing Procedure

Figure 9:
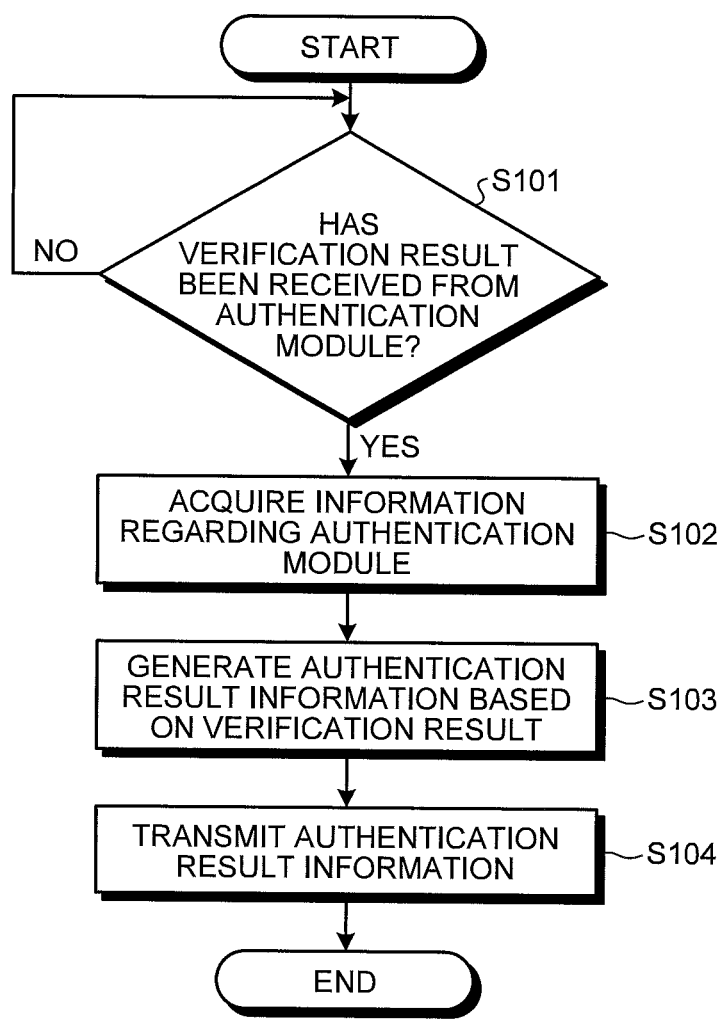
FIG. 9 is a flowchart illustrating a procedure for the authentication processing by a meta authentication module according to the embodiment.

Next, a procedure for the processing by the meta authentication module 50 according to the embodiment will be described with reference to FIG. 9. FIG. 9 is a flowchart illustrating a procedure for the authentication processing by the meta authentication module 50 according to the embodiment.

As illustrated in FIG. 9, the generation unit 53 determines whether the verification result has been received from a certain authentication module (step S101). When the verification result has not been received (step S101: No), the generation unit 53 stands by until the reception.

On the other hand, when the generation unit 53 has received the verification result (step S101: Yes), the authentication module management unit 52 acquires information regarding the authentication module that has transmitted this verification result (step S102).

Thereafter, the generation unit 53 refers to the information regarding the authentication module, which has been acquired by the authentication module management unit 52, to generate the authentication result information based on the verification result received from that authentication module (step S103). The generation unit 53 then transmits the generated authentication result information to the user terminal 10 (step S104).

6. Variations

The above-described authentication processing by the meta authentication module 50 can be carried out in various types of different modes in addition to the aforementioned embodiment. Accordingly, other embodiments of the meta authentication module 50 will be described hereinafter.

6-1. Management for Each of Authentication Modules

The aforementioned embodiment has indicated an example where the meta authentication module 50 uses the private key and the public key issued for a link to the authentication server 100, which have been registered in advance, to carry out the authentication. At this time, in the indicated example, the authentication server 100 registers the meta authentication module 50 thereto to trust the authentication result information transmitted from the meta authentication module 50, thereby carrying out the authentication. Here, the meta authentication module 50 may be configured to transmit, to the authentication server 100, information regarding the authentication module managed by the meta authentication module 50 itself so as to undergo different types of the authentication processing depending on each of the authentication modules. This point will be described with reference to FIG. 10.

FIG. 10 is a diagram illustrating an example of a meta authentication module information storage unit 121 according to a variation. In the example illustrated in FIG. 10, the meta authentication module information storage unit 121 has items such as "meta authentication module ID", "terminal ID", "authentication user", "authentication module ID", "trustworthiness", and "public key". The description of the items that have been already described will be omitted.

"Terminal ID" is information identifying the information processing terminal that woks in coordination with the meta authentication module. The terminal ID is assumed to correspond to the reference numeral of the user terminal. For example, the terminal ID of the user terminal 10 is indicated as "10".

Specifically, FIG. 10 indicates that the meta authentication module identified by the meta authentication module ID "50" manages the authentication modules provided in the user terminal 10 identified by the terminal ID "10", the authentication modules provided in the user terminal 10 are individually identified by "14a", "14b", and "14c", a user to be authenticated by the respective authentication modules is "U1", the trustworthiness of the authentication modules is "4", "5", and "3", respectively, and the public key corresponding to the meta authentication module 50 is "K02". The trustworthiness of each of the authentication modules may be set by the meta authentication module 50, or alternatively, may be set by the authentication server 100 as described above. In addition, the trustworthiness of the authentication modules may be configured to be synchronized between the meta authentication module 50 and the authentication server 100 in accordance with the specification by any one thereof. As described above, the meta authentication module 50 and the authentication server 100 mutually confirm the trustworthiness of the authentication module, thereby being able to guarantee the trustworthiness regarding the authentication carried out locally.

Specifically, a meta authentication module management unit 133 according to the variation manages the meta authentication module 50 itself and also manages the authentication module managed by the meta authentication module 50. In this case, the meta authentication module 50 adds, into the authentication result information, information indicating which authentication module has supplied the verification result, based on which the authentication result information has been generated.

Thereafter, the analyzer 132 that has received the transmitted authentication result information analyzes the authentication result information.

At this time, the analyzer 132 acquires the information from the meta authentication module management unit 133, thereby, in accordance with the value of the item of the trustworthiness stored in the meta authentication module information storage unit 121, determining which authentication module within the meta authentication module 50 has supplied the verification result on which the authentication result information worth being trusted is based. For example, when the transmitted authentication result information is authentication result information based on the verification result from the authentication module indicated by the authentication module ID "14b", the analyzer 132 determines this authentication result information as having the highest degree of trustworthiness.

Thereafter, while giving the signature using the public key K02 corresponding to the meta authentication module 50, the analyzer 132 adds thereto the information on the trustworthiness corresponding to the authentication module. Accordingly, the analyzer 132 can add the information indicating what degree of the trustworthiness the authentication module used in the authentication carried out in the user terminal 10 has. The authentication server 100 then returns information including this information to the user terminal 10. As described above, according to the meta authentication module 50 and the authentication server 100, not only the trustworthiness of the meta authentication module itself but also personal authentication information including the information regarding the trustworthiness of each of the authentication modules managed by the meta authentication module 50 can be passed to the user terminal 10. As a result, a service provider such as the web server 200 can maintain the access control with ease, for example, by providing a service at a level in agreement with the trustworthiness of the personal authentication information held by the user terminal 10.

The aforementioned processing may be carried out by a generation unit 53 according to the meta authentication module 50. Specifically, while generating the authentication result information from the verification result acquired from the authentication module, the generation unit 53 may add the information regarding the trustworthiness of this authentication module into the authentication result information. With this, the generation unit 53 can generate the authentication result information including the trustworthiness of each of the authentication modules and therefore can inform the authentication server 100 that, for example, the authentication result information has been generated based on the authentication module having a higher degree of safety.

The processing described thus far may be realized through the generation of the authentication result information using the individual private key issued for each of the authentication modules. Specifically, when the authentication module information storage unit 51 stores the plurality of authentication modules, the generation unit 53 generates the authentication result information with respect to each of the verification results acquired from the plurality of authentication modules by using the individual private key issued for each of the corresponding authentication modules. Consequently, the generation unit 53 can generate the authentication result information including the trustworthiness and the like of each of the authentication modules. Additionally, by transmitting the authentication result information using the individual private key to the authentication server 100, the meta authentication module 50 can undergo the authentication processing based on the trustworthiness of each of the authentication modules.

6-2. Configuration of Authentication Processing System (1)

The aforementioned embodiment has indicated an example where the meta authentication module 50 generates the authentication result information based on the verification result acquired from the authentication module provided in the user terminal 10. Here, the meta authentication module 50 may cause a predetermined external device to generate the authentication result information instead of generating the authentication result information by itself. This point will be described with reference to FIG. 11.

Figure 11:
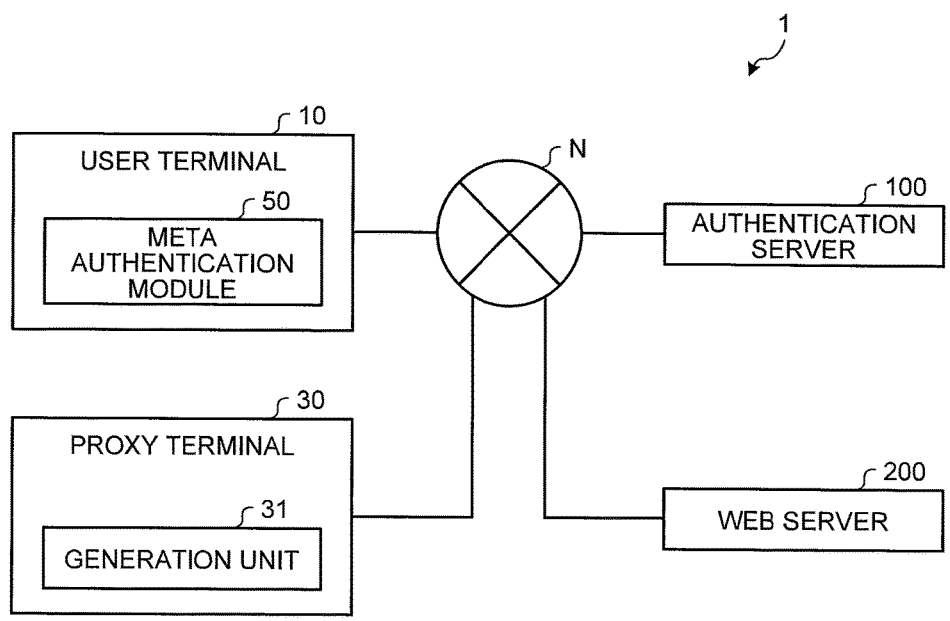
FIG. 11 is a diagram (1) illustrating an exemplary configuration of an authentication processing system according to a variation.

FIG. 11 is a diagram (1) illustrating an exemplary configuration of an authentication processing system 1 according to a variation. As illustrated in FIG. 11, the authentication processing system 1 according to the variation includes a proxy terminal 30 in addition to a user terminal 10, a meta authentication module 50, an authentication server 100, and a web server 200. In addition, the proxy terminal 30 includes a generation unit 31.

The proxy terminal 30 is an information processing terminal capable of communicating with the user terminal 10, the meta authentication module 50, and the like. Meanwhile, as in the generation unit 53 included in the meta authentication module 50 according to the embodiment, the generation unit 31 according to the proxy terminal 30 is a processor capable of generating the authentication result information serving as information to be processed through a specific protocol defined between the generation unit 31 and the authentication server 100, based on the verification result according to the authentication module.

In the example illustrated in FIG. 11, the meta authentication module 50 is assumed to have determined the proxy terminal 30 as a terminal worth being trusted and registered the proxy terminal 30 in advance to manage. It is also assumed that the proxy terminal 30 has the public key and the private key issued in advance for a link to the authentication server 100 and additionally, the proxy terminal 30 and the meta authentication module 50 (or the user terminal 10) are associated with each other to be registered to the authentication server 100.

When the user attempts the authentication using the authentication module, the meta authentication module 50 transmits the verification result according to the authentication module to the proxy terminal 30 at a stage prior to the generation of the authentication result information. Thereafter, the proxy terminal 30 uses the private key issued in advance for a link to the authentication server 100 to generate the authentication result information from the verification result transmitted from the meta authentication module 50. The proxy terminal 30 then transmits the generated authentication result information to the authentication server 100.

The authentication server 100 uses the public key issued in advance for a link to the proxy terminal 30 to inspect the signature in the authentication result information transmitted from the proxy terminal 30. Thereafter, among information managed by the authentication server 100, the authentication server 100 refers to the information in which the meta authentication module 50 (or the user terminal 10) and the proxy terminal 30 are registered by being associated with each other. The authentication server 100 then carries out the personal authentication of the user using the user terminal 10 based on the authentication result information transmitted from the proxy terminal 30. The authentication server 100 gives information indicating that the personal authentication has been done to the authentication result information transmitted from the proxy terminal 30 to transmit to the user terminal 10.

As described above, when generating the authentication result information, the meta authentication module 50 may cause the proxy terminal 30 capable of generating the information to be processed through a specific protocol to generate the authentication result information based on the verification result acquired from the authentication module.

Accordingly, while managing the processing for generating the authentication result information, the meta authentication module 50 can delegate the generation processing itself to the proxy terminal 30 that carries out the processing on behalf thereof. Consequently, even in a case where the meta authentication module 50 cannot generate the authentication result information by itself due to a change in a situation, for example, due to the modification of the definition of the protocol used by the authentication server 100, by newly registering the proxy terminal 30 capable of generating the authentication result information, the meta authentication module 50 can cause the proxy terminal 30 to carry out the authentication of the user terminal 10. As described above, the meta authentication module 50 can carry out the flexible authentication processing in response to various situations.

Additionally, when generating the authentication result information, the meta authentication module 50 may make a selection based on the trustworthiness of the meta authentication module 50 and the proxy terminal 30 relative to the authentication server 100 between the generation of the authentication result information by the meta authentication module 50 itself and the generation of the authentication result information by handling the proxy terminal 30.

Specifically, the meta authentication module 50 refers to the information managed by the authentication server 100 to determine which of the meta authentication module 50 and the proxy terminal 30 has a higher degree of trustworthiness relative to the authentication server 100. Thereafter, for example, the meta authentication module 50 causes one with a higher degree of trustworthiness to generate the authentication result information. Having a high degree of trustworthiness relative to the authentication server 100 means, when described in different words, having a high degree of strength of the authentication. Therefore, the meta authentication module 50 selects a device assumed to be able to carry out the personal authentication with a higher degree of credibility to carry out the processing. As a result, the meta authentication module 50 can guarantee the safety and the credibility of the personal authentication. In this case, the authentication server 100 may be configured to store the information regarding the trustworthiness of the meta authentication module 50 and the proxy terminal 30 to the meta authentication module information storage unit 121 as appropriate.

6-3. Configuration of Authentication Processing System (2)

The aforementioned embodiment has illustrated an example where the meta authentication module 50 is provided within the user terminal 10 and works in coordination with the user terminal 10 to carry out the processing. Here, the meta authentication module 50 may not be provided within the user terminal 10 so as to be configured as an external device capable of being connected to the user terminal 10. This point will be described with reference to FIG. 12.

Figure 12:
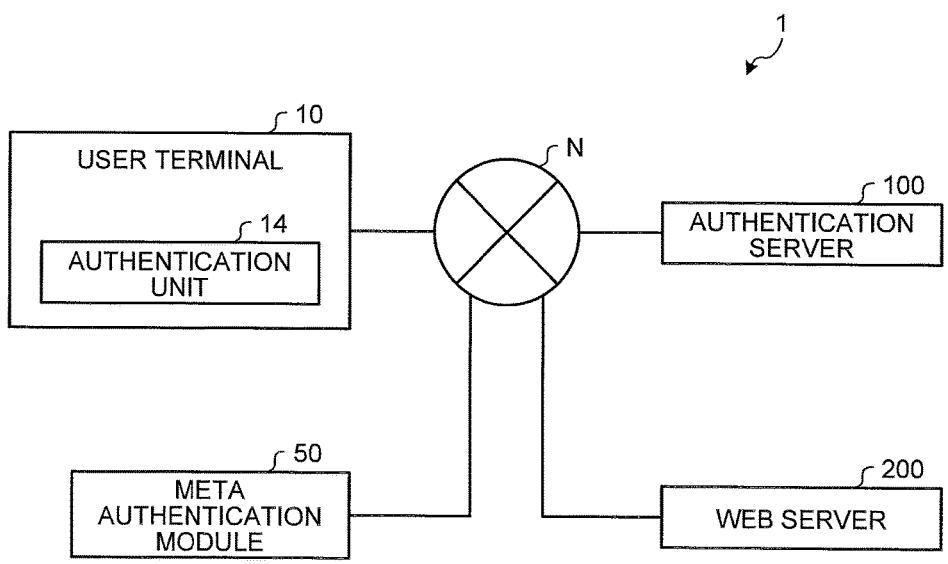
FIG. 12 is a diagram (2) illustrating an exemplary configuration of the authentication processing system according to a variation.

FIG. 12 is a diagram (2) illustrating an exemplary configuration of an authentication processing system 1 according to a variation. As illustrated in FIG. 12, the authentication processing system 1 according to the variation includes a user terminal 10, a meta authentication module 50, an authentication server 100, and a web server 200, where the user terminal 10 and the meta authentication module 50 are configured as separate devices. In the example in FIG. 12, the meta authentication module 50 is, for example, a server device recognized as an independent generation device.

In this case, when the verification between the registration data and the input data has been carried out by a predetermined authentication module provided in the authentication unit 14, the user terminal 10 transmits the verification result to the meta authentication module 50. Thereafter, as described in the aforementioned embodiment, the meta authentication module 50 generates the authentication result information and transmits this information to the authentication server 100. The authentication server 100 refers to information in which the user terminal 10 is registered in advance as a terminal managed (trusted) by the meta authentication module 50 and, based on the authentication result information transmitted from the meta authentication module 50, carries out the personal authentication of the user using the user terminal 10.

The meta authentication module 50 may be treated as the independent generation device in this manner instead of being provided within the user terminal 10. In this case, the meta authentication module 50 may be connected to the user terminal 10 in a wired manner, or alternatively, may be installed in a cloud, for example, so as to work only when requested by the user terminal 10. Additionally, the meta authentication module 50 is not limited to being used by one user terminal 10 and may manage a plurality of information processing terminals so as to be used by the plurality of information processing terminals. In this case, the authentication server 100 may associate the plurality of information processing terminals managed by the meta authentication module 50 with the meta authentication module 50 to store to a meta authentication module information storage unit 121. As described above, the meta authentication module 50 can carry out the flexible authentication processing in response to various situations.

6-4. Modes

As described in the aforementioned embodiment and variations, the meta authentication module 50 can be realized in various modes. For example, the meta authentication module 50 may be realized as an IC chip built in the user terminal 10 or may be realized as an independent generation device. Alternatively, the meta authentication module 50 may be realized as a program (application) in which the functions of the authentication module management unit 52 and the generation unit 53 are integrated. When the meta authentication module 50 is an application, this application is installed in the user terminal 10 in accordance with the operation of the user to be executed. Additionally, in this case, the authentication module information storage unit 51 is realized by, for example, using a predetermined storage region included in the user terminal 10.

6-5. Configurations of Respective Devices

The aforementioned embodiment has described the exemplary configurations of the user terminal 10 and the meta authentication module 50 with reference to FIG. 5. Meanwhile, the exemplary configuration of the authentication server 100 has been described with reference to FIG. 7. However, the respective devices included in the authentication processing system 1 may not be necessarily realized through the configurations given as examples. For example, the user terminal 10 is not necessarily required to be provided with all of the processors exemplified in FIG. 5. Accordingly, the user terminal 10 may not be necessarily provided with the display unit 13 and the authentication unit 14 therein. In addition, the configuration of the user terminal 10 illustrated in FIG. 5 may be realized by two or more separate apparatuses. For example, the user terminal 10 may be realized by two or more apparatuses having a configuration in which an authentication apparatus including at least the authentication unit 14 and the acquisition unit 16 and a communication apparatus including at least the communication unit 11 are separated.

6-6. Authentication Module

As an example of the authentication locally carried out by the authentication module, the aforementioned embodiment has indicated the authentication carried out in a situation where the connection to a wide-area network such as the Internet is not required, for example, the authentication using the fingerprint authentication module 14a or the like provided within the user terminal 10. However, the local authentication is not limited to the aforementioned example and, for example, the meta authentication module 50 may approve, as the local authentication, the authentication by way of an authentication module provided by a communication company providing a communication line. For example, the communication company installs a stationary authentication module at a store kept by the communication company. The user carries the user terminal 10 provided with the meta authentication module 50 to the store to carry out the personal authentication using the stationary authentication module. The meta authentication module 50 acquires the verification result according to the stationary authentication module through a line installed at the store. Thereafter, the meta authentication module 50 generates the authentication result information based on the verification result according to the stationary authentication module to transmit to the authentication server 100. In this case, for example, the communication company may set such use restriction that only a contract user of the communication line provided by the communication company can use the stationary authentication module. With this, the meta authentication module 50 can cause even the user terminal 10 not provided with the authentication module to undergo the authentication processing by the authentication server 100. Meanwhile, in a case where predetermined access control is maintained in a trustworthy manner, the authentication module may be located in a cloud. In this case, once a predetermined condition for accessing the authentication module in the cloud (for example, personal registration in advance) is satisfied, the user can carry out the authentication by way of the authentication module in the cloud. Thereafter, the meta authentication module 50 generates the authentication result information based on the verification result acquired from the authentication module in the cloud. As described above, the meta authentication module 50 may generate the authentication result information based on the verification result acquired from various authentication modules depending on a situation. As a result, the meta authentication module 50 can respond to the flexible authentication processing.

7. Hardware Configuration

Figure 13:
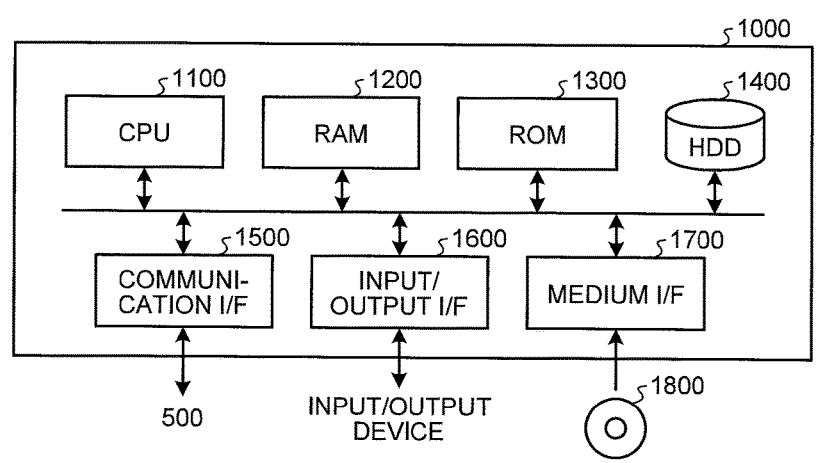
FIG. 13 is a hardware configuration diagram illustrating an example of a computer that realizes a function of a generation device.

The user terminal 10, the generation device corresponding to the meta authentication module 50, and the authentication server 100 according to the embodiment described thus far are realized by a computer 1000, for example, configured as illustrated in FIG. 13. The following description will use the meta authentication module 50 as an example. FIG. 13 is a hardware configuration diagram illustrating an example of the computer 1000 that realizes the function of the meta authentication module 50. The computer 1000 includes a CPU 1100, a RAM 1200, a ROM 1300, an HDD 1400, a communication interface (I/F) 1500, an input/output interface (I/F) 1600, and a medium interface (I/F) 1700.

The CPU 1100 works based on a program stored in the ROM 1300 or the HDD 1400 to control respective constituent members. The ROM 1300 stores a boot program executed by the CPU 1100 at the startup of the computer 1000, a program that depends on the hardware of the computer 1000, and the like.

The HDD 1400 stores a program executed by the CPU 1100 along with data used by this program, and the like. The communication interface 1500 receives data from another apparatus through a communication network 500 (corresponding to the network N illustrated in FIG. 2) to send to the CPU 1100 and transmits data generated by the CPU 1100 to another apparatus through the communication network 500.

The CPU 1100 controls output devices such as a display and a printer and input devices such as a keyboard and a mouse through the input/output interface 1600. The CPU 1100 acquires data from the input device through the input/output interface 1600. In addition, the CPU 1100 outputs the generated data to the output device through the input/output interface 1600.

The medium interface 1700 reads a program or data stored in a recording medium 1800 to provide to the CPU 1100 through the RAM 1200. The CPU 1100 loads this program to the RAM 1200 from the recording medium 1800 through the medium interface 1700 and executes the loaded program. Examples of the recording medium 1800 include an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the meta authentication module 50 according to the embodiment, the CPU 1100 of the computer 1000 executes the program loaded on the RAM 1200, thereby realizing the functions of the authentication module management unit 52 and the generation unit 53. Meanwhile, the HDD 1400 stores data within the authentication module information storage unit 51. The CPU 1100 of the computer 1000 reads these programs from the recording medium 1800 to execute but in another example, these programs may be acquired from another device through the communication network 500.

8. Others

Among various types of the processing described in the aforementioned embodiment, all or some of the processing described as being automatically carried out can be carried out manually, or reversely, all or some of the processing described as being manually carried out can be carried out automatically using a publicly available method. In addition to this, information indicated within this document and the drawings described above including processing procedures, specific names, and various types of data and parameters can be arbitrarily altered unless otherwise specially stated. For example, various types of the information illustrated in the respective drawings are not limited to the information illustrated in the drawings.

Each of the illustrated components of the respective devices serves as a sort of a function concept and thus is not necessarily required to be physically configured as illustrated. In other words, specific modes of separation and integration of the respective devices are not limited to the illustrated ones and accordingly, all or some thereof can be configured so as to be functionally and physically separated or integrated in any units depending on various types of loads, usage, and the like. For example, the authentication module management unit 52 and the generation unit 53 illustrated in FIG. 5 may be integrated. Meanwhile, for example, the information stored in the authentication module information storage unit 51 may be stored in a storage device provided in the outside thereof through the network N.

Additionally, the embodiment and the variations described thus far can be combined as appropriate with each other as long as each of the processing content does not conflict to the others.

9. Effects

As described thus far, the meta authentication module 50 (an example of the generation device) according to the embodiment includes the authentication module information storage unit 51 and the generation unit 53. The authentication module information storage unit 51 stores the information regarding the authentication module that carries out the authentication based on a result of the verification between the registration data registered in advance and predetermined input data. The generation unit 53 controls the generation of the authentication result information which is information generated from the verification result acquired from the authentication module while serving as information to be processed through a specific authentication procedure used between the generation unit 53 and the authentication server 100 that carries out the personal authentication of the user using the authentication module.

As described above, the meta authentication module 50 according to the embodiment stores the information regarding the authentication module used by the user locally during the personal authentication. In addition, the meta authentication module 50 controls the generation of the authentication result information to be processed through a specific protocol, which is information based on the result of the verification carried out in the authentication module. As a result, in addition to the authentication module managed by the authentication server 100, the meta authentication module 50 can use the authentication module managed by the meta authentication module 50 itself to carry out the authentication locally, thereby generating the information to be transmitted to the authentication server 100 by solely using the information on the result thereof. Accordingly, the meta authentication module 50 can carry out the authentication processing without using the authentication module managed by the authentication server 100, or the like, and thus can flexibly respond to the authentication request.

Meanwhile, the generation unit 53 uses the private key forming a pair with the public key held in the authentication server 100, which private key is retained within the meta authentication module 50, to generate the signature for the verification result acquired from the authentication module, thereby generating the authentication result information.

As described above, by generating the authentication result information conforming to the public key cryptography, the meta authentication module 50 according to the embodiment can generate the authentication result information having a higher degree of safety. In addition, the meta authentication module 50 generates the authentication result information by using the private key issued for a link between the authentication server 100 and the meta authentication module 50, rather than the private key issued for each authentication module. Consequently, according to the meta authentication module 50, because it is not required to issue the public key and the private key for each authentication module, the flexible authentication processing can be realized.

Furthermore, when the authentication module information storage unit 51 stores the plurality of authentication modules, the generation unit 53 generates the authentication result information with respect to the respective verification results acquired from the plurality of authentication modules by using a private key common thereto.

As described above, for example, even in a case where the plurality of authentication modules is used in the user terminal 10, the meta authentication module 50 according to the embodiment can cause the authentication processing to be carried out through the common private key.

Consequently, according to the meta authentication module 50, because the plurality of authentication modules is centralized to be managed, the individual authentication modules can be used to carry out the authentication without a need a procedure such as one for registering the individual authentication modules to the authentication server 100 (issuing a key for each of the authentication modules). In this manner, according to the meta authentication module 50, the user using the user terminal 10 can omit the effort for registering the respective authentication modules to the authentication server 100 and accordingly, the authentication processing can be simplified.

Additionally, when the authentication module information storage unit 51 stores the plurality of authentication modules, the generation unit 53 may be configured to generate the authentication result information with respect to each of the verification results acquired from the plurality of authentication modules by using the individual key issued for each of the corresponding authentication modules.

As described above, the meta authentication module 50 can generate the authentication result information by using a key different for each of the authentication modules. Therefore, for example, in a case where the authentication by way of a predetermined authentication module specified by the authentication server 100 or the web server 200 is required, the meta authentication module 50 can transmit the authentication result information generated by the proper authentication module to the authentication server 100. As a result, in response to a service such as one that provides a different level of services depending on, for example, the authentication module used in the local authentication, the meta authentication module 50 can properly generate the authentication result information in accordance with the service.

Meanwhile, the generation unit 53 may cause the proxy terminal 30 (an example of the external device) capable of generating the information to be processed through a specific authentication procedure to generate the authentication result information based on the verification result acquired from the authentication module.

As described above, the meta authentication module 50 according to the embodiment is not necessarily required to generate the authentication result information by itself and may cause the external device to generate the authentication result information through the management thereof. Consequently, the meta authentication module 50 can flexibly carry out the authentication processing in response to various types of expected changes in a situation such as the change of the protocol for the communication with the authentication server 100 or the update of the information regarding the authentication module.

Furthermore, the generation unit 53 makes a selection based on the trustworthiness of the meta authentication module 50 and the proxy terminal 30 relative to the authentication server 100 between the generation of the authentication result information by the generation unit 53 itself and the generation of the authentication result information by handling the proxy terminal 30.

As described above, by selecting a device set as having a higher degree of trustworthiness in the relation with the authentication server 100, the meta authentication module 50 according to the embodiment can cause that device to generate the authentication result information. Because having a high degree of trustworthiness relative to the authentication server 100 consequently means having a high degree of strength of the authentication, the meta authentication module 50 can carry out the processing by selecting a device expected to be able to carry out the personal authentication more surely. As a result, the meta authentication module 50 can guarantee the safety and the credibility of the personal authentication.

Additionally, the meta authentication module 50 according to the embodiment further includes the authentication module management unit 52 managing the information regarding the trustworthiness of the authentication module. Based on the information regarding the trustworthiness of the authentication module, the generation unit 53 selects the authentication module, based on which the authentication result information is to be generated.

As described above, the meta authentication module 50 according to the embodiment manages the trustworthiness of each of the authentication modules. In addition, the meta authentication module 50 can generate the authentication result information by selecting the authentication module having a higher degree of trustworthiness. For example, the meta authentication module 50 manages, as having a high degree of trustworthiness, the authentication module that uses information with a low possibility of being maliciously used by a third party with the intension of spoofing or the like during the authentication. The meta authentication module 50 is consequently caused to generate the authentication result information by using the authentication module having a higher degree of safety and thus can carry out the safe authentication processing.

Meanwhile, the authentication module management unit 52 updates the information regarding the trustworthiness of the authentication module based on the trustworthiness of the authentication module specified by the authentication server 100. Based on the trustworthiness of the authentication module specified by the authentication server 100, the generation unit 53 selects the authentication module, based on which the authentication result information is to be generated.

As described above, the meta authentication module 50 according to the embodiment may carry out the processing based on the trustworthiness of each of the authentication modules received from the authentication server 100. Consequently, because the authentication processing is carried out while the trustworthiness of the authentication module is confirmed mutually with the authentication server 100, the meta authentication module 50 can carry out the safe authentication in which the trustworthiness of the authentication module is guaranteed.

Additionally, the generation unit 53 may add the information regarding the trustworthiness of the authentication module into the authentication result information to be generated from the verification result acquired from that authentication module.

As described above, the meta authentication module 50 according to the embodiment can add the information regarding the trustworthiness of the authentication module used in the authentication into the authentication result information to be generated. Accordingly, with respect to the personal authentication information, the meta authentication module 50 can indicate details such as whether the information represents that the authentication with a higher degree of credibility has been carried out. As a result, a service provider managing the web server 200, or the like can maintain the access control with ease, for example, by setting an allowable range of a service or appropriately adjusting services to be approved for the user authenticated based on the processing by the meta authentication module 50.

Meanwhile, the user terminal 10 according to the present application includes the communication unit 11 that communicates with the meta authentication module 50 and the transmitter 17 that transmits the authentication result information acquired from the meta authentication module 50 to the authentication server 100.

As described above, by communicating with the meta authentication module 50, the user terminal 10 can receive the personal authentication from the authentication server 100 even when, for example, the user terminal 10 by itself does not have a function corresponding to a specific protocol used in the communication with the authentication server 100 or does not have the private key corresponding to the authentication server 100. In this manner, the meta authentication module 50 expands a range of the authentication processing available for the user of the user terminal 10, thereby enabling the flexible authentication processing.

Some of the embodiments according to the present application have been described thus far in detail with reference to the drawings. Note that these embodiments merely serve as examples and the present invention can be carried out in another mode subjected to various modifications and improvements based on the knowledge of those skilled in the art as well as the modes described in the section of the disclosure of the invention.

Additionally, "section", "module" and "unit" described above can be read as "means", "circuit", and the like. For example, the generation unit can be read as a generation means and a generation circuit.

According to an aspect of an embodiment, an effect that enables flexible response to an authentication request is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A generation device comprising:
   a memory storing information regarding several authentication modules each configured to carry out authentication based on a result of verification between registration data registered in advance and predetermined input data; and
   a processor programmed to:
      receive, from a user, first user input to be used in local authentication processing;
      perform local authentication processing based on the received first user input;
      when the local authentication processing based on the received first user input results in the user being confirmed as a valid user:
         issue a public key and a common private key;
         store the common private key in the memory in association with the user; and
         transmit the public key to an authentication server; and
      upon receiving, from the user, second user input to be used in local authentication processing, the second user input being authentication information corresponding to one of the several authentication modules in the memory:
         perform the local authentication processing based on the received second user input; and
         when the local authentication processing based on the second user input results in the user being confirmed as a valid user:
            generate authentication result information, regardless of a type of authentication information of the second user input, based on the common private key stored in the memory in association with the user, the authentication result information being processed by a specific protocol used between the generation device and the authentication server; and
         transmit the generated authentication result information to the authentication server to cause the authentication result information to be processed.

2. The generation device according to claim 1, wherein the processor is further programmed to: use the common private key stored within the memory to give a signature to verification result information acquired from the authentication module and consequently generate the authentication result information using the signature.

3. The generation device according to claim 2, wherein the processor is further programmed to: generate the authentication result information with respect to respective verification results acquired from the several authentication modules by using the common private key, which is common to the several authentication modules.

4. The generation device according to claim 2, wherein the processor is further programmed to: generate the authentication result information with respect to respective verification results acquired from the several authentication modules by using the individual public key, which is issued for each of the corresponding authentication modules.

5. The generation device according to claim 1, wherein the processor is further programmed to: cause an external device capable of generating information to be processed through the specific protocol to generate the authentication result information based on a verification result acquired from the authentication module.

6. The generation device according to claim 5, wherein the processor is further programmed to: make a selection based on a trustworthiness of the generation device and the external device relative to the authentication server between the generation of the authentication result information and the generation of the authentication result information by the external device.

7. The generation device according to claim 1, wherein the processor is further programmed to: based on information regarding a trustworthiness of the authentication module, select the authentication module, based on which the authentication result information is to be generated.

8. The generation device according to claim 7, wherein the processor is further programmed to:
   based on the trustworthiness of the authentication module specified by the authentication server, update information regarding the trustworthiness of the authentication module, and
   based on the trustworthiness of the authentication module specified by the authentication server, select the authentication module, based on which the authentication result information is to be generated.

9. The generation device according to claim 7, wherein the processor is further programmed to: add the information regarding the trustworthiness of the authentication module into the authentication result information to be generated from the verification result acquired from that authentication module.

10. A terminal device comprising:
    a communication interface configured to communicate with the generation device of claim 1; and at least one processor programmed to:
  transmit, via the communication interface, the authentication result information acquired from the generation device to the authentication server.

11. A generation method carried out by a computer, the generation method comprising:
  storing, in a memory, information regarding several authentication modules each configured to carry out authentication based on a result of verification between registration data registered in advance and predetermined input data;
  receiving, by a processor, from a user, first user input to be used in local authentication processing;
  performing local authentication processing, by the processor, based on the received first user input;
  when the local authentication processing based on the received first user input results in the user being confirmed as a valid user:
    issuing, by the processor, a public key and a common private key;
    storing, by the processor, the common private key in the memory in association with the user; and
    transmitting, by the processor, the public key to an authentication server; and
  upon receiving, from the user, second user input to be used in local authentication processing, the second user input being authentication information corresponding to one of the several authentication modules in the memory:
    performing the local authentication processing, by the processor, based on the received second user input; and
    when the local authentication processing based on the second user input results in the user being confirmed as a valid user:
      generating authentication result information, by the processor, regardless of a type of authentication information of the second user input, based on the common private key stored in the memory in association with the user, the authentication result information being processed by a specific protocol used between the generation device and the authentication server; and
      transmitting, by the processor, the generated authentication result information to the authentication server to cause the authentication result information to be processed.

12. A non-transitory computer readable storage medium having stored therein a generation program that, when executed by a computer that includes a memory that stores information regarding several authentication modules each configured to carry out authentication based on a result of verification between registration data registered in advance and predetermined input data, causes the computer to:
  receive, from a user, first user input to be used in local authentication processing;
  perform local authentication processing based on the received first user input;
  when the local authentication processing based on the received first user input results in the user being confirmed as a valid user:
    issue a public key and a common private key;
    store the common private key in the memory in association with the user; and
    transmit the public key to an authentication server; and
  upon receiving, from the user, second user input to be used in local authentication processing, the second user input being authentication information corresponding to one of the several authentication modules in the memory:
    perform the local authentication processing based on the received second user input; and
    when the local authentication processing based on the second user input results in the user being confirmed as a valid user:
      generate authentication result information, regardless of a type of authentication information of the second user input, based on the common private key stored in the memory in association with the user, the authentication result information being processed by a specific protocol used between the generation device and the authentication server; and
      transmit the generated authentication result information to the authentication server to cause the authentication result information to be processed, wherein.

13. An authentication processing system comprising a generation device and an authentication server, wherein
  the generation device includes:
    a memory that stores information regarding several authentication modules each configured to carry out authentication based on a result of verification between registration data registered in advance and predetermined input data; and
    a processor programmed to:
      receive, from a user, first user input to be used in local authentication processing;
      perform local authentication processing based on the received first user input;
      when the local authentication processing based on the received first user input results in the user being confirmed as a valid user:
        issue a public key and a common private key;
        store the common private key in the memory in association with the user; and
        transmit the public key to an authentication server; and
      upon receiving, from the user, second user input to be used in local authentication processing, the second user input being authentication information corresponding to one of the several authentication modules in the memory:
        perform the local authentication processing based on the received second user input; and
        when the local authentication processing based on the second user input results in the user being confirmed as a valid user:
          generate authentication result information, regardless of a type of authentication information of the second user input, based on the common private key stored in the memory in association with the user, the authentication result information being processed by a specific protocol used between the generation device and the authentication server; and
          transmit the generated authentication result information to the authentication server to cause the authentication result information to be processed, and
  the authentication server includes one or more processors that associate the generation device with a public key corresponding to the public key transmitted by the generation device.

* * * * *